(12) United States Patent
Liu et al.

(10) Patent No.: US 9,060,165 B2
(45) Date of Patent: Jun. 16, 2015

(54) 3D VIDEO COMMUNICATION METHOD, SENDING DEVICE AND SYSTEM, IMAGE RECONSTRUCTION METHOD AND SYSTEM

(75) Inventors: Yuan Liu, Shenzhen (CN); Jing Wang, Shenzhen (CN); Kai Li, Shenzhen (CN); Song Zhao, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 1054 days.

(21) Appl. No.: 13/038,055

(22) Filed: Mar. 1, 2011

(65) Prior Publication Data

US 2011/0150101 A1   Jun. 23, 2011

Related U.S. Application Data

(63) Continuation of application No. PCT/CN2009/073542, filed on Aug. 26, 2009.

(30) Foreign Application Priority Data

Sep. 2, 2008   (CN) .......................... 2008 1 0119545
Oct. 30, 2008   (CN) .......................... 2008 1 0225195

(51) Int. Cl.
*H04N 13/00*   (2006.01)
*H04N 13/02*   (2006.01)
(Continued)

(52) U.S. Cl.
CPC ....... *H04N 13/0022* (2013.01); *H04N 13/0018* (2013.01); *H04N 13/0051* (2013.01);
(Continued)

(58) Field of Classification Search
CPC .......... H04N 21/8547; H04N 13/0051; H04N 13/0066; H04N 13/0048; H04N 13/004; H04N 13/0022; H04N 13/0018; H04N 13/0007; H04N 13/0003; H04N 13/0246; H04N 13/025; H04N 13/0271
See application file for complete search history.

(56) References Cited

U.S. PATENT DOCUMENTS 6,084,979 A * 7/2000 Kanade et al. ................. 382/154
2001/0026561 A1  10/2001 Morris et al.
(Continued)

FOREIGN PATENT DOCUMENTS

CN   1381148 A   11/2002
CN   1432969 A   7/2003
(Continued)

OTHER PUBLICATIONS

DBpia, "Three-dimensional Video Generation for Realistic Broadcasting Services".*
(Continued)

*Primary Examiner* — David N Werner
(74) *Attorney, Agent, or Firm* — Brinks Gilson & Lione

(57) ABSTRACT

The disclosure includes a 3-dimensional (3D) video communication method, a 3D video sending device, a 3D video communication system, an image reconstruction method, and an image reconstruction system. The method includes: obtaining timestamped video image data of a scene collected by image collecting apparatuses, where the video image data includes at least one depth image and at least two color images; and encoding the video image data and sending the encoded video image data. The system includes a sending device and a receiving device. The sending device obtains at least one depth image and at least two color images of the scene through the image collecting apparatuses, the obtained depth images are accurate and reliable, and the collection of the video images is highly real-time. When reconstructing the images at the viewpoints, the receiving device can repair the reconstructed images by using the obtained color images.

16 Claims, 18 Drawing Sheets

(51) Int. Cl.
*H04N 21/8547* (2011.01)
*H04N 19/597* (2014.01)
*H04N 13/04* (2006.01)

(52) U.S. Cl.
CPC ........ *H04N13/0066* (2013.01); *H04N 13/0048* (2013.01); *H04N 13/0044* (2013.01); *H04N 13/004* (2013.01); *H04N 13/0003* (2013.01); *H04N 13/02* (2013.01); *H04N 13/0246* (2013.01); *H04N 13/025* (2013.01); *H04N 13/0271* (2013.01); *H04N 13/00* (2013.01); *H04N 13/0239* (2013.01); *H04N 13/0282* (2013.01); *H04N 13/0296* (2013.01); *H04N 2213/005* (2013.01); *H04N 19/597* (2014.11)

(56) References Cited

U.S. PATENT DOCUMENTS

| | | | | |
|---|---|---|---|---|
| 2001/0045979 | A1* | 11/2001 | Matsumoto et al. | 348/43 |
| 2004/0070667 | A1* | 4/2004 | Ando | 348/46 |
| 2005/0254817 | A1 | 11/2005 | McKee | |
| 2006/0088206 | A1* | 4/2006 | Era | 382/154 |
| 2006/0227132 | A1 | 10/2006 | Jang et al. | |
| 2007/0201859 | A1 | 8/2007 | Sarrat | |
| 2009/0195640 | A1* | 8/2009 | Kim et al. | 348/43 |
| 2010/0238264 | A1* | 9/2010 | Liu et al. | 348/14.13 |
| 2011/0292043 | A1* | 12/2011 | Kim et al. | 345/419 |
| 2014/0078248 | A1* | 3/2014 | Tsukagoshi | 348/43 |

FOREIGN PATENT DOCUMENTS

| | | |
|---|---|---|
| CN | 1954606 A | 4/2007 |
| CN | 101312542 A | 11/2008 |
| CN | 101483770 A | 7/2009 |
| CN | 101668219 B | 5/2012 |
| EP | 1931150 A1 | 6/2008 |
| WO | WO 2005114998 A1 | 12/2005 |
| WO | WO 2006/041261 A1 | 4/2006 |
| WO | WO 2006/049384 A1 | 5/2006 |

OTHER PUBLICATIONS

L. Zhang & W.J. Tam, "Stereoscopic Image Generation Based on Depth Images for 3D TV", 51 IEEE Transactions on Broadcasting 191-1999 (Jun. 2005).*
Office Action issued in corresponding European Patent Application No. 09811030.7, mailed Jul. 17, 2012.
Schiller et al., "Calibration of a PMD-camera Using a Planar Calibration Pattern Together with a Multi-Camera Setup" The Int. Archives of the Photogrammetry, Remote Sensing and Spatial Information Sciences, 2008.
Office Action issued in corresponding European Patent Application No. 09811030.7, mailed Mar. 15, 2013.
Office Action issued in corresponding Chinese Patent Application No. 200810119545.9, mailed Sep. 13, 2010.
Office Action issued in corresponding Chinese Patent Application No. 200810225195.4, mailed Nov. 30, 2010.
Extended European Search Report issued in corresponding European Patent Application No. 09811030.7, mailed Jul. 11, 2011.
Written Opinion of the International Searching Authority issued in corresponding PCT Patent Application No. PCT/CN2009/073542, mailed Dec. 3, 2009.
International Search Report issued in corresponding PCT Patent Application No. PCT/CN2009/073542, mailed Dec. 3, 2009.
Ho et al., "Three-dimensional Video Generation for Realistic Broadcasting Services", The 23$^{rd}$ International Technical Conference on Circuits/Systems, Computers and Communications ITC-CSCC, 2008. XP-002537269.
Merkle et al., "Efficient Compression of Multi-View Depth Data Based on MVC", Proc. 3DTV-CON 2007, Kos Island, Greece, May 2007.

* cited by examiner

3D VIDEO COMMUNICATION METHOD, SENDING DEVICE AND SYSTEM, IMAGE RECONSTRUCTION METHOD AND SYSTEM

CROSS-REFERENCE TO RELATED APPLICATIONS

This application is a continuation of International Application No. PCT/CN2009/073542, filed on Aug. 26, 2009, which claims priority to Chinese Patent Application No. 200810119545.9, filed on Sep. 2, 2008 and Chinese Patent Application No. 200810225195.4, filed on Oct. 30, 2008, all of which are hereby incorporated by reference in their entireties.

FIELD OF THE INVENTION

The present invention relates to video technologies, and in particular, to a 3-dimensional (3D) video communication method, a 3D video sending device, a 3D video communication system, an image reconstruction method, and an image reconstruction system.

BACKGROUND OF THE INVENTION

A conventional video bears 2D image information. It presents the content of an object but ignores the depth information such as the distance and location of the object, and is incomplete. As a watcher of the video, a person needs to obtain space information more than a 2D image to have a visual experience equivalent to watching the world with two eyes of a human being.

In the 3D video technology, pictures comply with 3D visual principles of human beings and provide depth information. Therefore, the 3D video technology presents views of the external world on the screen authentically, and renders the objects of scenes in depth, hierarchically, and authentically. It is an important trend of video technologies. The depth information of a scene is important in a 3D video system. A depth image is also known as a parallax image of the scene. In the conventional art, the following methods are available for obtaining a depth image of a scene:

One method is to obtain the depth image of scenes through 3D image matching. That is, multiple color images of a scene are obtained through photographing on a camera. The color images are the 2D images of the scene. The color images are analyzed and calculated so that the depth image of the scene is obtained. The basic principles are: For a point in the scene, find the corresponding imaging point in the multiple color images; and calculate out the coordinates of this point in the space according to the coordinates of this point in the multiple color images to obtain the depth information of this point.

The 3D image matching technology includes a window-based matching method and a dynamic planning method, both employing an algorithm based on grayscale matching. The algorithm based on grayscale matching splits a color image into small subareas, uses the grayscale value as a template, and finds the subarea of similar grayscale value distribution in other color images. If two subareas meet the similarity requirement, the points in the two subareas are regarded as matching. In the matching process, the relevant functions are generally used to measure the similarity of two areas. The algorithm based on grayscale matching can obtain a depth image of dense scenes.

Moreover, 3D image matching may be performed through an algorithm based on feature matching. The algorithm based on feature matching uses the feature exported from the grayscale information of the color image to perform matching. Compared with the algorithm that uses the simple luminance and grayscale change information to perform matching, the algorithm based on the feature matching is more stable and accurate. The features for matching may be potential important features that can describe the 3D structure of a scene, for example, edges and vertices. The algorithm based on feature matching can obtain a depth image of sparse scenes first, and then use the method such as interpolation to obtain a depth image of dense scenes.

Another method is to obtain the depth image of scenes through a single depth camera.

The basic principles of a depth camera are to determine the distance of an object by transmitting infrared and detecting the strength of infrared reflected by the object in the scene. Therefore, the depth image output by a depth camera is of high quality, high precision, and good application prospect. Currently, a depth camera is primarily used for gesture recognition, background replacement and synthesis, and is seldom applied in the 3D video system. Generally, only a single depth camera is used to collect the video images of scenes.

When a single depth camera is used to collect the video images of scenes, the depth image of scenes is precise, but a single depth camera can obtain only one color image of a scene of a viewpoint and the corresponding depth image. A good reconstruction effect may be achieved at the time of reconstructing images of virtual viewpoints of small parallax. At the time of reconstructing images of virtual viewpoints of large parallax, however, few color images are obtained, and the color image information is deficient, so large "cavities" exist in the reconstructed images of virtual viewpoints and are not repairable. Therefore, the reconstructed images are seriously distorted and the reconstruction effect is poor.

FIG. 1 shows how cavities are generated at the time of reconstructing images of virtual viewpoints according to video images collected by a single depth camera in the conventional art. It is assumed that video images of object 1a and object 1b are obtained at viewpoint o1. Because object 1b shadows part 1a0 of object 1a, the actually obtained video image information includes only partial image information of object 1a and image information of object 1b, and does not include the image information of part 1a0 of object 1a. In the attempt of obtaining the video images of object 4a and object 1b at viewpoint o2, because the actually obtained video image information lacks image information of part 1a0 of object 1a, the image reconstructed at viewpoint o2 lacks the image of part 1a0 of object 1a, and a cavity is generated at part 1a0. Therefore, the reconstructed images are seriously distorted and the reconstruction effect is poor.

In the process of implementing the present invention, the inventor finds at least the following defects in the conventional art: The 3D matching algorithm depends on the luminance and chrominance information of the scene, and is vulnerable to impacts caused by uneven illumination, the noise of a camera, and repeated textures of scenes. Therefore, the obtained parallax/depth image includes many errors, the effect of reconstructing virtual viewpoints based on the depth image is inferior, and the reconstructed images are inaccurate. Moreover, the 3D matching algorithm is complex, and the real-time effect of obtaining the parallax/depth image is deteriorated, which baffles the commercial application of the technology. At the time of reconstructing images of virtual viewpoints of large parallax through a single depth camera, large "cavities" are generated and are not repairable, and therefore, the reconstructed images are seriously distorted, the reconstruction effect is poor, and the practicality is deteriorated.

SUMMARY OF THE INVENTION

The embodiments of the present invention provide a 3D video communication method, a 3D video sending device, a 3D video communication system, an image reconstruction method, and an image reconstruction system to improve the effect of reconstructing images of virtual viewpoints.

A 3D video communication method provided in an embodiment of the present invention includes:

obtaining video image data of a scene, where: the video image data includes at least one depth image and at least two color images; the video image data is collected by at least one image collecting apparatus capable of outputting depth information of the scene and at least one image collecting apparatus capable of outputting color/grayscale video information of the scene or collected by at least one image collecting apparatus capable of outputting both depth information and color/grayscale video information of the scene;

encoding the video image data to obtain encoded video image data; and sending the encoded video image data.

A 3D video sending device provided in an embodiment of the present invention includes:

a video collecting unit, adapted to obtain video image data of a scene, where: the video image data includes at least one depth image and at least two color images and is collected by image collecting apparatuses; the video collecting unit includes at least one image collecting apparatus capable of outputting depth information of the scene and at least one image collecting apparatus capable of outputting color/grayscale video information of the scene or includes at least one image collecting apparatus capable of outputting both depth information and color/grayscale video information of the scene;

a video encoding unit, adapted to encode the video image data to obtain encoded video image data; and a video outputting unit, adapted to send the encoded video image data.

An image reconstruction method provided in an embodiment of the present invention includes:

obtaining a color image at a known viewpoint;

obtaining a depth image at the known viewpoint;

performing depth-parallax transformation for the depth image to obtain parallax information corresponding to the depth image; and reconstructing an image at a virtual viewpoint according to the color image at the known viewpoint and the parallax information.

Another image reconstruction method provided in an embodiment of the present invention includes:

obtaining a first color image at a first known viewpoint and a second color image at a second known viewpoint;

obtaining a first depth image at the first known viewpoint;

determining a first depth-parallax mapping factor of the first depth image according to the first color image, the second color image, and the first depth image;

performing depth-parallax transformation for the first depth image according to the first depth-parallax mapping factor to obtain first parallax information; and reconstructing a third image at a virtual viewpoint according to the first color image and the first parallax information.

An image reconstruction system provided in an embodiment of the present invention includes:

an ordinary image collecting apparatus, adapted to obtain a color image at a known viewpoint;

a depth image collecting apparatus, adapted to obtain a depth image at the known viewpoint;

a transforming apparatus, adapted to perform depth-parallax transformation for the depth image to obtain parallax information corresponding to the depth image; and a reconstructing apparatus, adapted to reconstruct an image at a virtual viewpoint according to the color image at the known viewpoint and the parallax information.

Another image reconstruction system provided in an embodiment of the present invention includes:

a first ordinary image collecting apparatus, adapted to obtain a first color image at a first known viewpoint;

a second ordinary image collecting apparatus, adapted to obtain a second color image at a second known viewpoint;

a first depth image collecting apparatus, adapted to obtain a first depth image at the first known viewpoint;

a first determining apparatus, adapted to determine a first depth-parallax mapping factor of the first depth image according to the first color image, the second color image, and the first depth image;

a first transforming apparatus, adapted to perform depth-parallax transformation for the first depth image according to the first depth-parallax mapping factor to obtain first parallax information; and a first reconstructing apparatus, adapted to reconstruct a third image at a virtual viewpoint according to the first color image and the first parallax information.

A 3D video communication system provided in an embodiment of the present invention includes a sending device and a receiving device. The sending device includes:

a video collecting unit, adapted to obtain video image data of a scene, where: the video image data includes at least one depth image and at least two color images and is collected by image collecting apparatuses; the video collecting unit includes at least one image collecting apparatus capable of outputting depth information of the scene and at least one image collecting apparatus capable of outputting color/grayscale video information of the scene or includes at least one image collecting apparatus capable of outputting both depth information and color/grayscale video information of the scene;

a video encoding unit, adapted to encode the video image data to obtain encoded video image data; and a video outputting unit, adapted to send the encoded video image data.

The receiving device includes:

a video receiving unit, adapted to receive the encoded video image data sent by the video outputting unit; and a video decoding unit, adapted to decode the encoded video image data to obtain decoded video image data.

In the embodiments of the present invention, an image collecting apparatus capable of directly outputting a depth image of a scene collects the depth image of the scene. The obtained depth image is accurate and reliable, and the collected depth image is highly real-time. The video image at each virtual viewpoint is obtained effectively and accurately according to the depth image, and can reflect the authentic effect of the scene. Meanwhile, according to multiple color images of the scene obtained by the image collecting apparatus, the cavity generated in the reconstruction based on only one color image can be repaired. Therefore, the reconstructed video image is more accurate, and the reconstructed image at the virtual viewpoint is more effective and practical. Moreover, the image reconstruction is free from massive complicated calculations, and the image is reconstructed with high quality in real time.

DETAILED DESCRIPTION OF THE EMBODIMENTS

The embodiments of the present invention are described below with reference to accompanying drawings.

The embodiments of the present invention obtain the 3D video image at each viewpoint by obtaining depth images and color images of a scene and reconstructing the images based on the basic principles of 3D videos. Specifically, an image collecting apparatus obtains a depth image and multiple color images of a scene, namely, a depth image collecting apparatus capable of outputting depth information of the scene may be used to obtain the depth image of the scene, and an ordinary image collecting apparatus capable of outputting color/grayscale video information may be used to obtain the color or grayscale video image of the scene.

Figure 1:
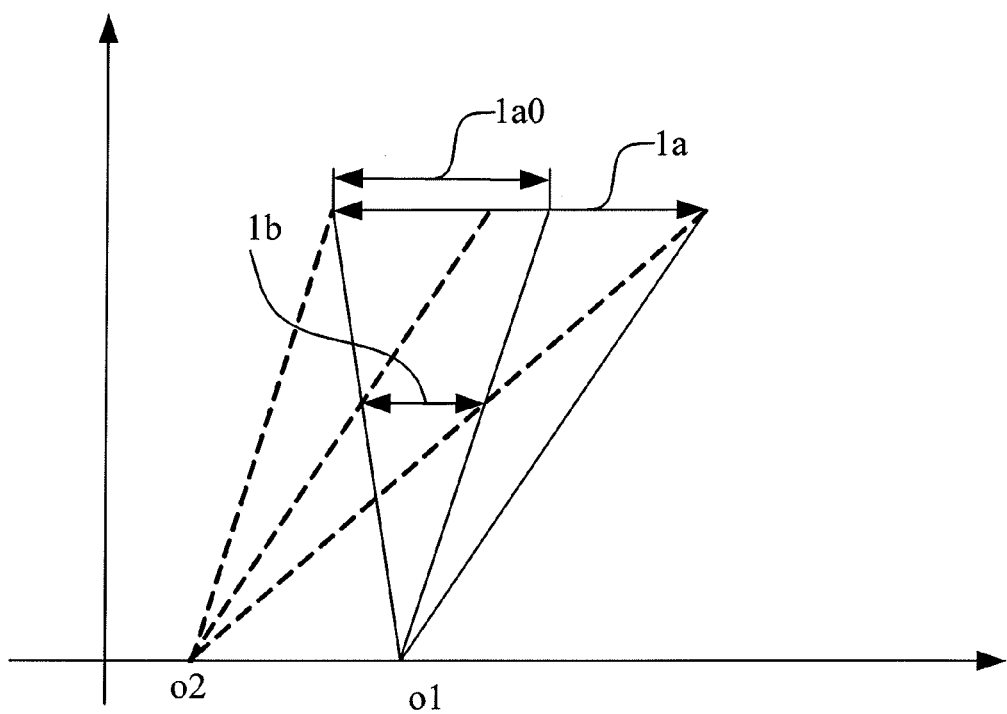
FIG. 1 shows how cavities are generated at the time of reconstructing images of virtual viewpoints according to video images collected by a single depth image collecting apparatus in the prior art.
Figure 2:
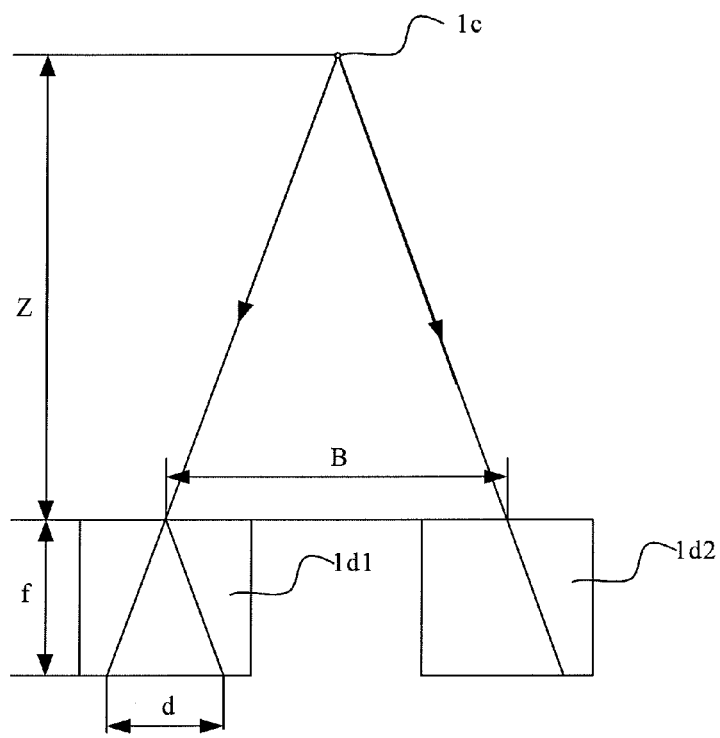
FIG. 2 shows principles of a 3D video system of a parallel dual-image collecting apparatus.

The following describes the basic principles of 3D videos, taking the parallel camera system as an example:

FIG. 2 shows principles of a 3D video system of a parallel dual-image collecting apparatus. As shown in FIG. 2, camera $1d1$ and camera $1d2$ are placed horizontally, the distance between them is B, and the distance from them to a photographed spatial point $1c$ is Z. The parallax/depth $d_x(m_l, m_r)$ in the horizontal direction fulfills:

$$d_x(m_l, m_r) = \begin{cases} \dfrac{x_l}{X_l} = \dfrac{f}{Z} \\ \dfrac{x_r}{X_r} = \dfrac{f}{Z} \end{cases} \Rightarrow x_l - x_r = \dfrac{f}{Z}(X_l - X_r) = \dfrac{fB}{Z}$$

In the formula above, f is the focal length; Z is the distance from object $1c$ to the imaging plane; B is the spacing between optical centers of two cameras; d is the parallax/depth and is the distance from the imaging pixel of one spatial point on one camera to the imaging pixel of the same spatial point on the other camera; d includes horizontal parallax $d_x$ and vertical parallax $d_y$. For a parallel camera system, $d_y$ is equal to 0. Evidently, the parallax of a 3D image is related to distance Z from the watcher. Therefore, if the imaging position of a spatial point on an image and the parallax/depth corresponding to this point are known, we can calculate out the imaging position of this point on another image; if the depth images and color images of enough scenes are obtained, we can reconstruct 3D video images of the scene on various viewpoints.

Multi-Viewpoint (MV)/Free Viewpoint (FV) videos are another hot topic of research in the video field currently. A scene may be photographed through multiple cameras from different angles to generate multiple video streams. The video streams on different viewpoints are sent to a User Equipment (UE), and the user can select any viewpoint and any direction to watch the scene. The viewpoint selected by the user may be a predefined fixed photographing viewpoint of the camera, or a virtual viewpoint. The image is synthesized from authentic images photographed by surrounding cameras.

Besides, the 3D video is not exclusive of the MV/FV video mutually, but may be integrated with the MV/FV video in a system. Each viewpoint in the MV/FV video system may be watched in 2D or 3D mode.

Currently, the 3D video/MV video/FV video system generally uses "color image+depth image" to encode and transmit video images. Main functions of depth images are to: (1) encode and decode 3D video images effectively; and (2) reconstruct a virtual viewpoint effectively, where the virtual viewpoint is a viewpoint without a physical camera. The depth images may be used to reconstruct the image at other viewpoints. Therefore, "one color image+depth images" may be transmitted and decoded to obtain images at multiple viewpoints. The depth images are grayscale images, and can be compressed efficiently to reduce bit streams drastically. Further, a 3D/MV display generally needs to display multiple images in different positions simultaneously. "Color image+ depth images" may be used to generate images at other viewpoints according to the image at one viewpoint, which makes it unnecessary to transmit 2D images at different viewpoints simultaneously and saves the bandwidth.

To ensure the accuracy and real-time effect of the depth images of a scene and improve the effect of reconstructing the video image at the virtual viewpoint, the embodiments of the present invention use a depth image collecting apparatus to obtain the depth image of a scene, and use a depth image collecting apparatus and/or an ordinary image collecting apparatus to obtain the color image of the scene. In this way, the depth image collecting apparatus may be used to obtain the desired depth image, and the 3D video images at different viewpoints can be obtained according to multiple color images obtained by the ordinary image collecting apparatus. The following describes the principles of the depth image collecting apparatus briefly.

Figure 3:
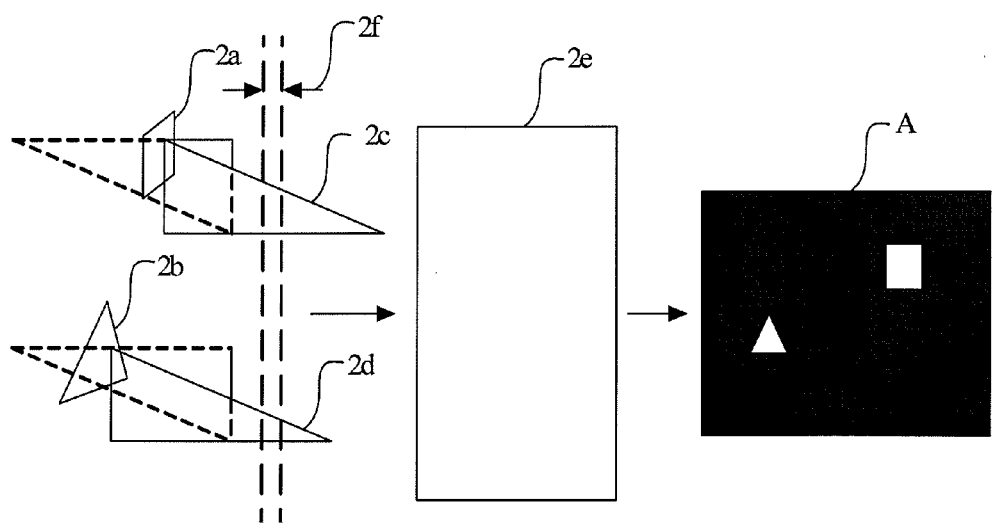
FIG. 3 shows principles of obtaining a depth image by using an intensity-modulated light emitter and a Computer Controlled Display (CCD) image collecting apparatus equipped with an ultra high speed shutter.

FIG. 3 shows principles of obtaining a depth image by using an intensity-modulated light emitter and a CCD image collecting apparatus equipped with an ultra high speed shutter. FIG. 3 shows a snapshot of spatial distribution of illumination intensity. The distribution increases linearly with time; 2c and 2d are a trend of spatial distribution of illumination intensity at the same moment. In the scene, object 2a and object 2b exist, object 2a is rectangular, and object 2b is triangular. The illumination intensity $I_1$ of the reflected ray on the near object 2a at the moment of being emitted onto the image collecting apparatus 2e is detected by the ultra high speed shutter 2f of the detector of the image collecting apparatus, and the rectangular distribution of the illumination intensity in image A is obtained; corresponding to the reflected ray on object 2b, the triangular distribution in image A is obtained. Because object 2a is close to the image collecting apparatus 2e, the instantaneous illumination intensity $I_1$ detected by the image collecting apparatus 2e is greater than $I_2$, the rectangular image is brighter than the triangular image, and the depth of the object can be detected according to the difference of captured luminance of image A. However, the luminance of a reflected ray of an object is related to the reflectivity of the object, distance from the object to the image collecting apparatus, modulation index of the light source, and space unevenness of illumination. In this case, the image B may be obtained by virtue of the feature of decreasing linearly against the spatial distribution of the illumination intensity, image A is combined with image B, the negative impact may be eliminated through a signal processing algorithm, and a precise depth image is obtained.

Figure 4:
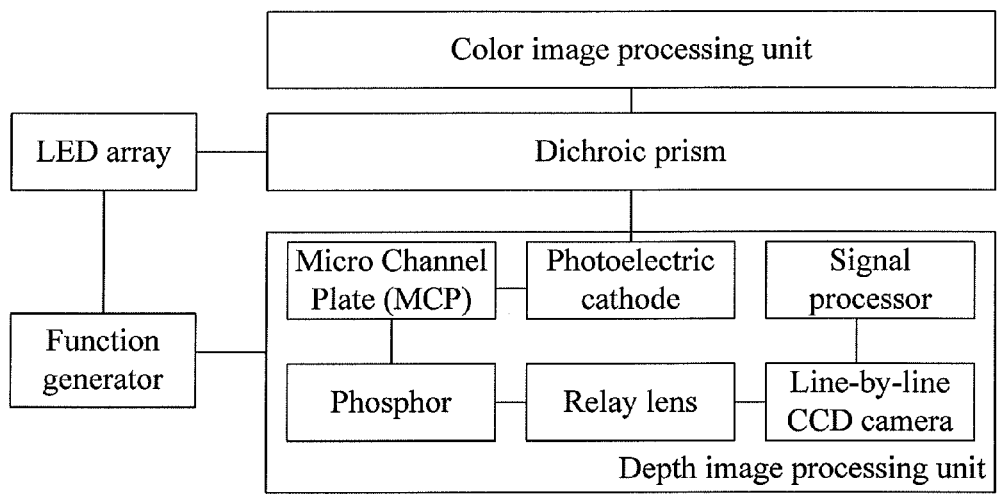
FIG. 4 shows a basic structure of an HDTV Axi-Vision image collecting apparatus.

FIG. 4 shows a basic structure of a High Definition Television (HDTV) Axi-Vision image collecting apparatus. As shown in FIG. 4, the HDTV Axi—Axi-Vision camera system includes a depth image processing unit and a color image processing unit. A near infrared LED array is applied in an intensity-modulated light emitter. It modulates intensity quickly and directly. The wavelength of the near infrared LED light is 850 nm, which falls outside the wavelength range of the visible light and does not interfere with the visible light. Four LED units surround the lens of the camera to illuminate the photographing scene evenly. A visible light source such as a fluorescent source is applied to illuminate the photographed object. This light source has a spectrum reaching beyond the near infrared light area. When the reflected ray of the object passes through a dichroic prism of the camera lens, the visible light is separated from the near infrared light. The visible light enters the color image processing unit and is processed by the color image processing unit, whereupon the color image (namely, the 2D image) of the object is obtained. The color image processing unit may be a color HDTV camera. The near infrared light is processed by the depth image processing unit so that the depth image of the object is obtained. In the depth image processing unit, the near infrared light separated out by the dichroic prism is focused onto the photoelectric cathode. At the same time, a short pulse bias is applied between the photoelectric cathode and a Micro Channel Plate (MCP) to accomplish a nanosecond shutter. An optical image of the object is obtained on the phosphor through startup of the shutter. The optical image is focused by a relay lens onto a high-resolution line-by-line CCD camera, and transformed into a photoelectron image. Finally, a depth image of the object is formed through a signal processor. The shutter startup frequency is equal to the light modulation frequency so that a better Signal to Noise Ratio (SNR) is obtained. Evidently, the depth camera obtains good depth images, which can be used to reconstruct video images of a good effect.

Figure 5:
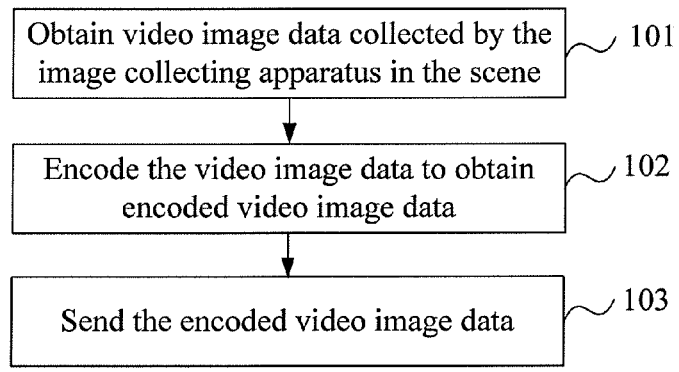
FIG. 5 is a flowchart of a 3D video communication method provided in the first embodiment of the present invention.

FIG. 5 is a flowchart of a 3D video communication method provided in the first embodiment of the present invention. As shown in FIG. 5, the method in this embodiment may include the following steps:

Step 101: Obtain video image data of a scene, where: the video image data includes at least one depth image and at least two color images; the video image data is collected by at least one image collecting apparatus capable of outputting depth information of the scene and at least one image collecting apparatus capable of outputting color/grayscale video information of the scene or collected by at least one image collecting apparatus capable of outputting both depth information and color/grayscale video information of the scene.

In the 3D video communication method provided in this embodiment, an image collecting apparatus obtains depth images and color images of a scene, namely, a depth image collecting apparatus capable of outputting depth information of the scene is used to obtain the depth images of the scene, and an ordinary image collecting apparatus capable of outputting color video information is used to obtain the color images of the scene. Besides, an ordinary image collecting apparatus capable of outputting grayscale images may be used to obtain grayscale images of the scene. Specifically, on the occasion of collecting video images of a scene, multiple image collecting apparatuses on different viewpoints may be set. The image collecting apparatuses refer to at least one depth image collecting apparatus capable of obtaining depth images of the scene and at least one ordinary image collecting apparatus capable of obtaining color images of the scene or refer to at least one depth image collecting apparatus capable of outputting both depth information and color/grayscale video information of the scene. At the time of collecting video images of a scene, the depth images and color images of the scene may be collected in real time. The 3D video image at each virtual viewpoint of the scene may be reconstructed according to the collected depth images and color images. If a collecting device is composed of multiple image collecting apparatuses, in the process of collecting the video images, it is practicable to control some image collecting apparatuses on a good viewpoint selectively as required to take photos and obtain the depth images and color images of only the required scene without photographing the duplicate or unnecessary scenes. Before photographing, the photographing position of each image collecting apparatus may be adjusted to obtain the video image of the scene in a wide perspective.

Step 102: Encode the video image data to obtain encoded video image data.

The video image data obtained in step 101 is encoded to obtain the encoded video image data of the scene. The video image data is encoded to facilitate transmission and storage of the video image data. Before encoding of the video image data, preprocessing operations such as correction may be performed for the video image data to ensure accuracy and reliability of the video image data.

Step 103: Send the encoded video image data.

After the encoded video image data is obtained, the encoded video image data may be sent to a video image receiving device. The video image receiving device decodes the encoded video image data, and reconstructs the video image at each virtual viewpoint. Finally, the video image at each viewpoint may be displayed by a display device. Specifically, the video image receiving device may display the desired video images according to the received encoded video image data. In the process of displaying the video image, the video images at various virtual viewpoints may be reconstructed and rendered to obtain video images of the scene on different viewpoints. In the process of displaying the video image of a scene, the video image at each viewpoint may be displayed according to requirements of the watcher. Because the depth images and color images of the scene are obtained by a depth image collecting apparatus and an ordinary image collecting apparatus in step 101, the obtained depth images are accurate and reliable. On the occasion of reconstructing the image at the virtual viewpoint, the cavity generated in the reconstructed image can be repaired through multiple color images. Therefore, the effect of reconstructed video images is improved, the reconstructed images at various virtual viewpoints can be obtained, and the effect of the reconstructed video images is good enough to reflect the authentic effect of the scene.

In this embodiment, an image collecting apparatus capable of outputting a depth image of a scene directly collects the depth image of the scene. The obtained depth image is accurate and reliable, and the collected depth image is highly real-time. The video image at each virtual viewpoint is obtained effectively and accurately according to the depth image, and can reflect the authentic effect of the scene. Meanwhile, according to multiple color images of the scene obtained by the image collecting apparatus, the cavity generated in the reconstruction based on only one color image can be repaired. Therefore, the reconstructed video image is more accurate, and the reconstructed image at the virtual viewpoint is more effective and practical.

Figure 6:
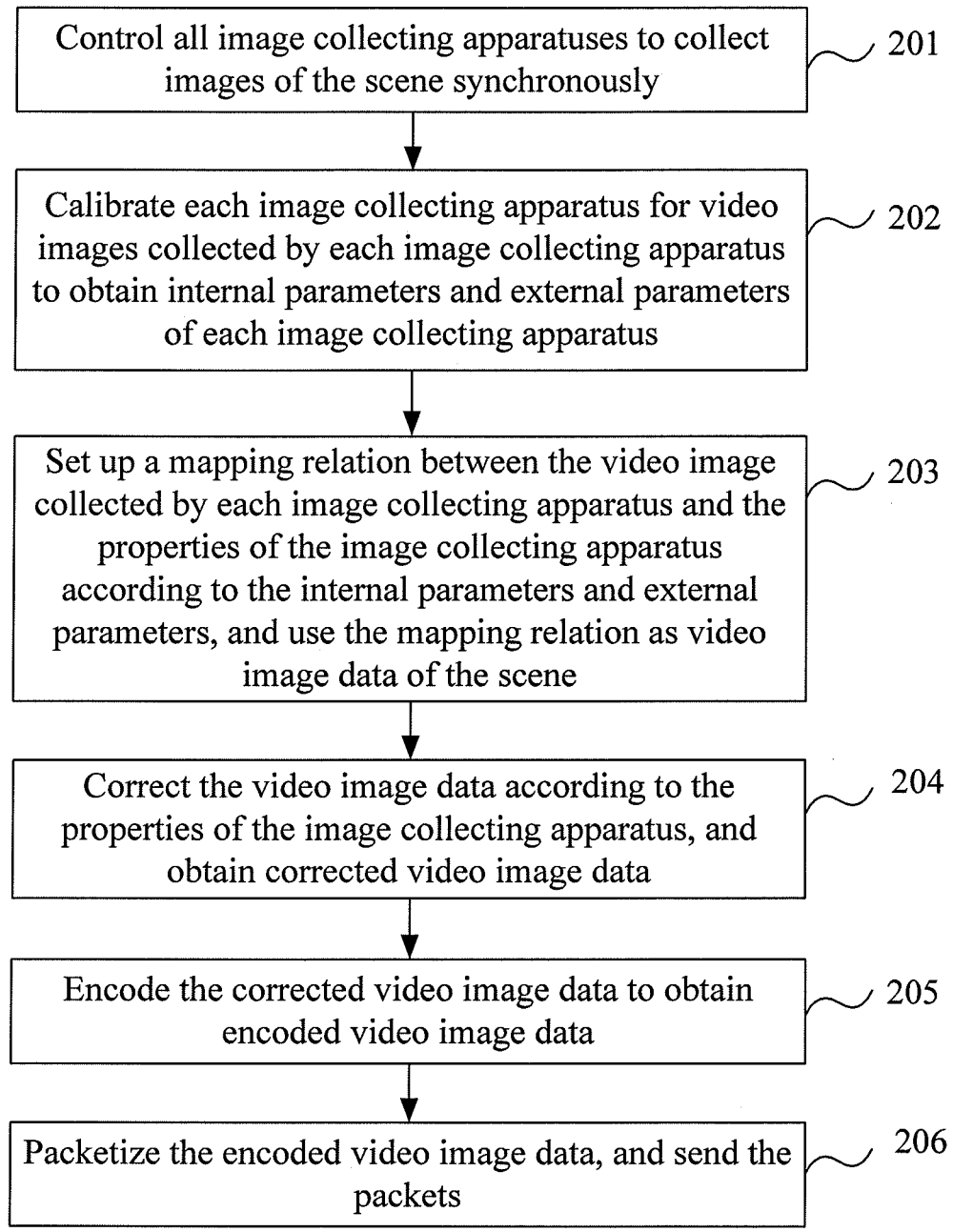
FIG. 6 is a flowchart of a 3D video communication method provided in the second embodiment of the present invention.

FIG. 6 is a flowchart of a 3D video communication method provided in the second embodiment of the present invention. As shown in FIG. 6, the method in this embodiment may include the following steps:

Step 201: Control all image collecting apparatuses to collect images of a scene synchronously.

In this embodiment, multiple image collecting apparatuses on different viewpoints may be set. The image collecting apparatuses on different viewpoints refer to at least one depth image collecting apparatus capable of outputting depth information of the scene and at least one ordinary image collecting apparatus capable of outputting color/grayscale video information of the scene or refer to at least one depth image collecting apparatus capable of outputting both depth information and color/grayscale video information of the scene. Before the collection of video images, a certain number of depth image collecting apparatuses and ordinary image collecting apparatuses may be set as required. The number of image collecting apparatuses is appropriate so long as the collected video image data of the scene includes at least one depth image and at least two color images. In this step, at the time of collecting images of the scene, all image collecting apparatuses may be controlled to perform synchronous photographing and collection of images, so as to ensure synchronization of the collected video images and prevent a sharp difference between images collected at the same moment on the same viewpoint or different viewpoints. Especially, for the object that moves at a high speed, synchronous collection achieves a good effect of video images.

Besides, before collection of the image data, the image collecting apparatuses may be placed in different positions for the purpose of obtaining the best photographing perspective, obtaining the video images in a wider perspective, ensuring proper reconstruction and display of the 3D video images at various viewpoints, and improving the effect of reconstructing video images at virtual viewpoints. For example, in the practical photographing, the depth image collecting apparatus may be placed between ordinary image collecting apparatuses. In this way, a wider photographing perspective is achieved, and the video images of the scene in a wider perspective can be achieved in the case of reconstructing the video images at virtual viewpoints.

In this step, synchronization signals may be generated at the time of controlling the image collecting apparatuses to perform synchronous photographing, and the image collecting apparatuses collect images of the scene synchronously according to the synchronization signals. Specifically, the synchronization signals are generated by hardware or software; or, the video output signals of an image collecting apparatus in the image collection process may be used as synchronization signals. At the time of controlling the image collecting apparatuses to collect images synchronously, the synchronization signals may be input into an external synchronization interface of each image collecting apparatus directly to control all image collecting apparatuses to collect images synchronously; or, a collection controlling module exercises synchronization control on all image collecting apparatuses. The synchronous collection can implement frame synchronization or line/field synchronization.

Step 202: Calibrate the image collecting apparatus for the video images collected by each image collecting apparatus to obtain internal parameters and external parameters of each image collecting apparatus.

The images obtained by multiple image collecting apparatuses are generally not aligned with the scan line, and not compliant with the imaging model of human eyes, which causes visual fatigue to users. Therefore, the images obtained by the image collecting apparatus need to be corrected so that they comply with the imaging model of human eyes. The correction may be based on the internal parameters and external parameters of the image collecting apparatus as a result of calibrating the image collecting apparatus. The calibration may be traditional calibration or self-calibration. The traditional calibration includes Direct Linear Transformation (DLT) calibration, Radial Alignment Constraint (RAC)-based calibration, and planar calibration. The basic principles of traditional calibration are as follows: use a calibration reference object to set up linear equations of an imaging model of the image collecting apparatus, work out the world coordinates of a group of points in the reference object and the corresponding coordinates of the points on the imaging plane, and then substitute values of the coordinates into the linear equations to work out the internal parameters and external parameters. Self-calibration refers to calibrating the image collecting apparatus through the mapping relation between the imaging points without involving any reference object. The self-calibration is based on the special constraint relation (such as a polar line constraint) between the imaging points in multiple images, and does not require structure information of the scene.

The calibration of the image collecting apparatus obtains the calibration information such as internal parameters and external parameters of the image collecting apparatus. The video images obtained by each image collecting apparatus can be corrected according to the internal parameters and external parameters of the image collecting apparatus. After the correction, the video images are more compliant with the imaging model of human eyes. The corrected video images bring a better visual effect to the watcher.

Step 203: Set up a mapping relation between the video image collected by each image collecting apparatus and the properties of the image collecting apparatus according to the internal parameters and external parameters, and use the mapping relation as video image data of the scene, where the properties of the image collecting apparatus include internal parameters and external parameters of the image collecting apparatus, and the collecting timestamp of each frame of the video image.

More specifically, a mapping relation is set up between the video image and the properties of each image collecting apparatus according to the internal parameters and external parameters, and is output as video image data of the scene, where the properties of the image collecting apparatus include internal parameters and external parameters of the image collecting apparatus, and the collecting timestamp of each frame of the video image. After the mapping relation between the properties of each image collecting apparatus and the collected video image is set up, the video image can be corrected according to the properties of the image collecting apparatus.

Step 204: Correct the video image data according to the properties of the image collecting apparatus, and obtain corrected video image data.

After the video image data is corrected according to the properties of each image collecting apparatus as well as the mapping relation between the video image and the properties of each image collecting apparatus, the corrected video image data is obtained. Specifically, the correction for the video image may include the following operations:

(1) Correct the color images and depth images according to calibration parameters of the image collecting apparatus, and align the color image with the depth image. For ease of reconstructing the image at a viewpoint, the content of the color image should be the same as the content of the depth image at this viewpoint. However, it is not possible for the position of an ordinary image collecting apparatus to coincide with the position of a depth image collecting apparatus exactly. Therefore, color images and depth images need to be transformed according to results of calibrating the image collecting apparatus to make the color image coincide with the depth image exactly.

(2) Adjust different image collecting apparatuses to remove the difference of luminance and chrominance of color images caused by setting, unify chrominance of the color images obtained by different image collecting apparatuses, and eliminate the image difference caused by different image collecting apparatuses.

(3) Correct the color images or depth images according to calibration parameters of the image collecting apparatus. For example, perform correction such as radial distortion for the images.

Step 205: Encode the corrected video image data to obtain encoded video image data.

In this embodiment, an encoding and decoding standard such as MPEG-4 and H.264 may be applied to encode the corrected color images and depth images. The depth may be expressed through the MPEG standard. Currently, many methods are available to encode data of color images and depth images, for example, a 3D video encoding method based on layering. This method combines SEI information in the H.264 protocol with the layered encoding conception, encodes the video data of a channel (such as color image data of the channel) into a basic layer inclusive of only I frames and P frames through a general method, and then encodes the data of another channel (such as depth image data) into P frames. The reference frame applied in the prediction is a previous frame in this channel or the corresponding frame in the basic layer. In this way, high 2D/3D compatibility is achieved in the decoding. For traditional 2D display, it is only necessary to decode the basic layer data; for 3D display, it is necessary to decode all data. In this way, the user can select 2D display or 3D display and control the video decoding module to perform the corresponding decoding.

Step 206: Packetize the encoded video image data and send the packets.

Before the video image is sent, the encoded video image data may be packetized and then sent to the video image receiving device. The receiving device processes the received packets and sends them through the existing network such as the Internet.

More specifically, step 206 which packetizes and sends the encoded video image data may include the following steps:

Step 2061: Multiplex the encoded video image data to obtain multiplexed data of the encoded video image data.

In this step, multiple encoded video data streams are multiplexed by frame or field. In the case of multiplexing the video data streams by field, one video data stream may be encoded into an odd field, and another video data stream may be encoded into an even field. The odd field and the even field are transmitted as one frame.

Step 2062: Packetize the encoded video image data which is multiplexed and send the packets.

Besides, in this embodiment, encoded voice data, system command data and/or file data may be received and packetized, and sent along with the encoded video image data; externally input control information (including watching viewpoint, display mode, and display distance information) may be received and used as a basis for adjusting the photographing of the image collecting apparatus. Therefore, the image collecting apparatus that has a good photographing perspective can be selected to collect video images of the scene, and the photographing angle of the image collecting apparatus and the number of images obtained by the image collecting apparatus can be adjusted. In this way, the video image collection is more practical. The video receiving device may receive the encoded video image data through a network and process the received data. The processing refers to: demultiplexing, decoding, reconstructing, rendering or displaying. The video receiving device may decode the received encoded voice data, and store the received file data, or perform specific operations according to the system command data, for example, display the received video image in the mode indicated in the system command.

The video image receiving device can reconstruct the video image of the scene on each virtual viewpoint according to the received depth images and color images of the scene. Because the depth images of the scene are obtained by the depth image collecting apparatus, the obtained depth images are accurate and reliable. Moreover, multiple color images or grayscale images of the scene are obtained by multiple ordinary image collecting apparatuses or depth image collecting apparatuses. In this way, the cavity generated in reconstruction based on only one color image can be repaired through multiple color images on the occasion of displaying the video image of the scene on each viewpoint, and the effect of reconstructing the video image at each viewpoint is improved. Meanwhile, because the image collecting apparatus collects the depth images and color images of the scene in real time, the collected video image data is practical.

In this embodiment, the image collecting apparatuses are controlled to collect video images of the scene synchronously, and the image collecting apparatuses are calibrated. As a result, the synchronized video image data and the calibration information of the image collecting apparatuses are obtained. Moreover, the video images collected by the image collecting apparatuses are corrected according to the calibration information so that the processing of video images is more accurate. Meanwhile, the video images are encoded to facilitate storage and transmission of massive video image data. This embodiment further improves precision of video collection and processing, improves the effect of reconstructed images, controls the collection of video images effectively according to the input control information, and improves practicality of video image collection.

Figure 7:
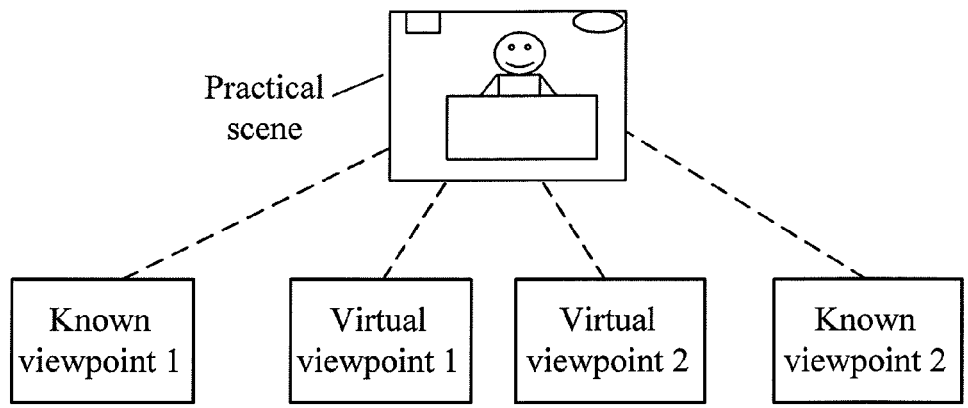
FIG. 7 shows a relation between a scene and a viewpoint in an embodiment of the present invention.
Figure 8:
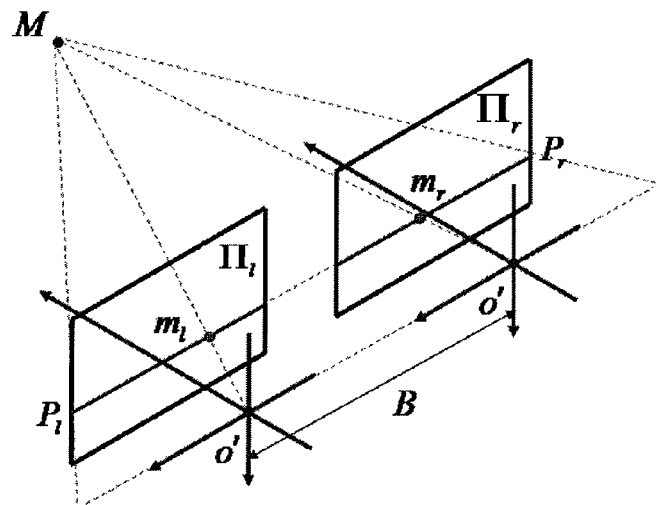
FIG. 8 shows a relation between a scene and an imaging point in an embodiment of the present invention.

After the depth images and color images at each viewpoint in the scene are obtained, the color images and the depth images at known viewpoints may be used to reconstruct the image at the virtual viewpoint. FIG. 7 shows a relation between a scene and a viewpoint in an embodiment of the present invention; and FIG. 8 shows a relation between a scene and an imaging point in an embodiment of the present invention. As shown in FIG. 7, on known viewpoint 1 and known viewpoint 2, images of a scene are obtained by an image collecting apparatus; a depth image collecting apparatus is placed on known viewpoint 1 to obtain depth images of the scene, and the images of the scene at virtual viewpoints (such as virtual viewpoint 1 and virtual viewpoint 2) between known viewpoint 1 and known viewpoint 2 are calculated out. As shown in FIG. 8, it is assumed that the imaging points of a point M (X, Y, Z) in two image collecting apparatuses are (x1, y1) and (x2, y2). With the baseline length B and the focal length f being known, depth Z is:

$$Z = \frac{fB}{x_2 - x_1} = \frac{fB}{\nabla x}$$

Therefore, the parallax of the images obtained by two image collecting apparatuses is $\nabla x_{21}$:

$$x_2 - x_1 = \nabla x_{21} = \frac{fB}{Z}$$

Therefore, the parallax at the intermediate virtual viewpoint X is $\nabla x_{20}$:

$$x_2 - x_0 = \nabla x_{20} = \frac{fB_{20}}{Z}$$

In this embodiment, the image at $x_0$ in the scene can be reconstructed if viewpoint $x_2$, viewpoint $x_1$, depth Z, and viewpoint $x_0$ are known. As indicated in the formula above, $x_2$ and parallax $\nabla x_{20}$ need to be known to reconstruct the image at $x_0$ in the scene. The depth information z of the depth images obtained by the depth information image collecting apparatus makes a relative sense only and can represent the depth relation of the scene, but is not parallax information that makes a practical sense. In the reconstruction, the scene depth information that makes no practical sense needs to be transformed into parallax information that makes a practical sense, namely, $\nabla x_{20}$ needs to be worked out according to depth Z.

The relation between depth and parallax is:

$$Z = \frac{fB}{x_2 - x_1} = \frac{fB}{\nabla x}$$

In the photographing process, the camera focal length f and the optical center distance of two cameras are constant, and therefore, fB is constant. After fB is determined, the depth can be transformed into parallax. The time overhead generated in the transformation is ignorable. Compared with the practice of obtaining parallax through a matching algorithm, the method above brings a good real-time effect.

To facilitate the description about the image reconstruction method and the image reconstruction system herein, known viewpoint 1 is supposed to be a left viewpoint, and known viewpoint 2 is supposed to be a right viewpoint. Therefore, the image obtained by the image collecting apparatus on known viewpoint 1 is the left image, and the image obtained by the image collecting apparatus on known viewpoint 2 is the right image; the depth information obtained by the image collecting apparatus on known viewpoint 1 is a left depth image, and the depth information obtained by the image collecting apparatus on known viewpoint 2 is a right depth image.

First, the idea of the image reconstruction method is expounded through an instance. In this instance, one ordinary image collecting apparatus and two depth image collecting apparatuses are configured. However, other configurations are also covered in the scope of the present invention. The two image collecting apparatuses are placed in parallel, and the optical center of the depth image collecting apparatus coincides with the optical center of the ordinary image collecting apparatus as far as possible. If the optical center of the depth image collecting apparatus is much distant from the optical center of the ordinary image collecting apparatus, the images obtained by the image collecting apparatuses will not coincide, and need to be aligned. The objective of the alignment is: A point in an image obtained by the depth image collecting apparatus coincides with the corresponding point in the image obtained by the ordinary image collecting apparatus. If the imaging coordinates of a point in an ordinary image collecting apparatus are $(x_1, y_1)$ and the imaging coordinates of this point in the depth image collecting apparatus are $(x_{d1}, y_{d1})$, the following equations apply:

$$x_1 - x_{d1} = 0$$

$$y_1 - y_{d1} = 0$$

Before reconstructing an image according to the image information obtained by an ordinary image collecting apparatus, it is necessary to correct the image to the parallel state, namely, only horizontal parallax exists and no vertical parallax exists in the two images. If the imaging coordinates of a point in two ordinary image collecting apparatuses are $(x_1, y_1)$ and $(x_2, y_2)$ respectively, the following equations apply:

$$x_1 - x_2 = d$$

$$y_1 - y_2 = 0$$

In the equations above, d is parallax between the left image and the right image (between known view point 1 and known viewpoint 2).

Afterward, the depth information z that makes no practical sense and is obtained by the depth image collecting apparatus needs to be transformed into parallax information $\nabla x$ that makes a practical sense according to the following formula:

$$Z = \frac{fB}{x_2 - x_1} = \frac{fB}{\nabla x}$$

The transformation is for determining the value of fB in the formula above. In this embodiment, a method based on feature point matching is preferred as a means of obtaining parallax between feature points in two images. In practice, the depth images obtained by the depth image collecting apparatus involve noises. In this embodiment, it is best to calculate N feature points and then work out the average value to remove noises and obtain a more precise fB value.

Supposing D=1/z and fB=$\lambda$, the following equations apply:

$$\lambda = \frac{\nabla x}{D}$$

$$\lambda = \frac{\sum_{i=1}^{N} \frac{\nabla x_i}{D_i}}{N}$$

After the depth-parallax mapping factor $\lambda$ is determined, the depth information of all points in the depth image can be transformed into parallax information, namely, $\nabla x = D \ast \lambda$. The foregoing method is applied to the left depth image and the right depth image respectively to determine the depth-parallax mapping factor $\lambda_1$ of the left depth image and the depth-parallax mapping factor $\lambda_2$ of the right depth image, and obtain the left parallax image and the right parallax image. For the virtual intermediate viewpoint x', the distance from this viewpoint to the optical center of the left ordinary image collecting apparatus (left camera) is B', and the parallax $\nabla x'$ between this viewpoint and the left camera is:

$$\nabla x' = D \ast \lambda' = D \ast fB'$$

Because the distance B' from the intermediate viewpoint x' and the optical center of the left camera is known, the relation between the parallax of the left camera and the parallax of the right camera is:

$$\frac{\nabla x'}{\nabla x} = \frac{B'}{B}$$

Therefore, the parallax between the intermediate viewpoint and the left camera is:

$$\nabla x' = \frac{B'}{B} \nabla x$$

Therefore, every point of the virtual intermediate viewpoint can be worked out according to the parallax between this point and the image obtained by the left camera.

Figure 9:
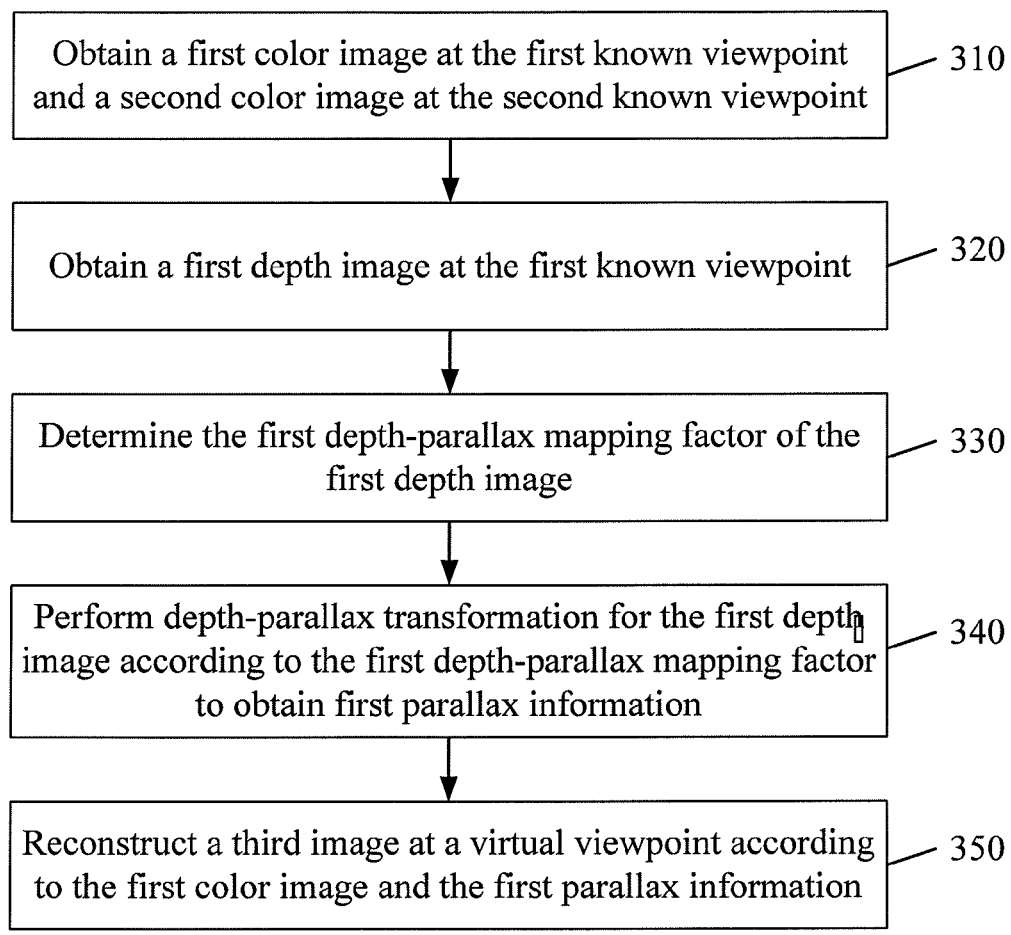
FIG. 9 is a flowchart of an image reconstruction method provided in the first embodiment of the present invention.

FIG. 9 is a flowchart of an image reconstruction method provided in the first embodiment of the present invention. In this embodiment, a depth image collecting apparatus capable of outputting both depth images and color images may be placed at the first viewpoint, and an ordinary image collecting apparatus capable of outputting color images may be placed at the second viewpoint. The depth image collecting apparatus obtains the depth image and the color image at the first viewpoint, and the ordinary image collecting apparatus obtains the color image at the second viewpoint. Specifically, the method includes the following steps:

Step 310: Obtain a first color image at a first known viewpoint and a second color image at a second known viewpoint.

An ordinary image collecting apparatus obtains the color images of the scene on the first known viewpoint and the second known viewpoint respectively.

Step 320: Obtain a first depth image at the first known viewpoint.

Step 330: Determine the first depth-parallax mapping factor of the first depth image.

More specifically, a first depth-parallax mapping factor of the first depth image is determined according to the first color image, the second color image, and the first depth image.

The method for determining the depth-parallax mapping factor has been detailed above.

Step 340: Perform depth-parallax transformation for the first depth image according to the first depth-parallax mapping factor to obtain first parallax information.

The principles and process of performing depth-parallax transformation for the first depth image according to the first depth-parallax mapping factor to obtain first parallax information have been detailed above.

Step 350: Reconstruct a third image at a virtual viewpoint according to the first color image and the first parallax information.

After the depth-parallax mapping factor is determined in step 330, the determined depth-parallax mapping factor can be reused in subsequent image reconstruction. That is, after the depth-parallax mapping factor is determined, step 330 does not need to be performed again.

In this embodiment, the depth images are obtained directly, and the depth images are transformed into parallax information for reconstructing images. Therefore, it is not necessary to obtain parallax information through the 3D matching algorithm or perform massive complicated calculations, and the image reconstruction is more real-time. Because no 3D matching algorithm needs to be performed for reconstructing images, no inter-frame flicker exists, and the quality of reconstructed images is improved.

Figure 10:
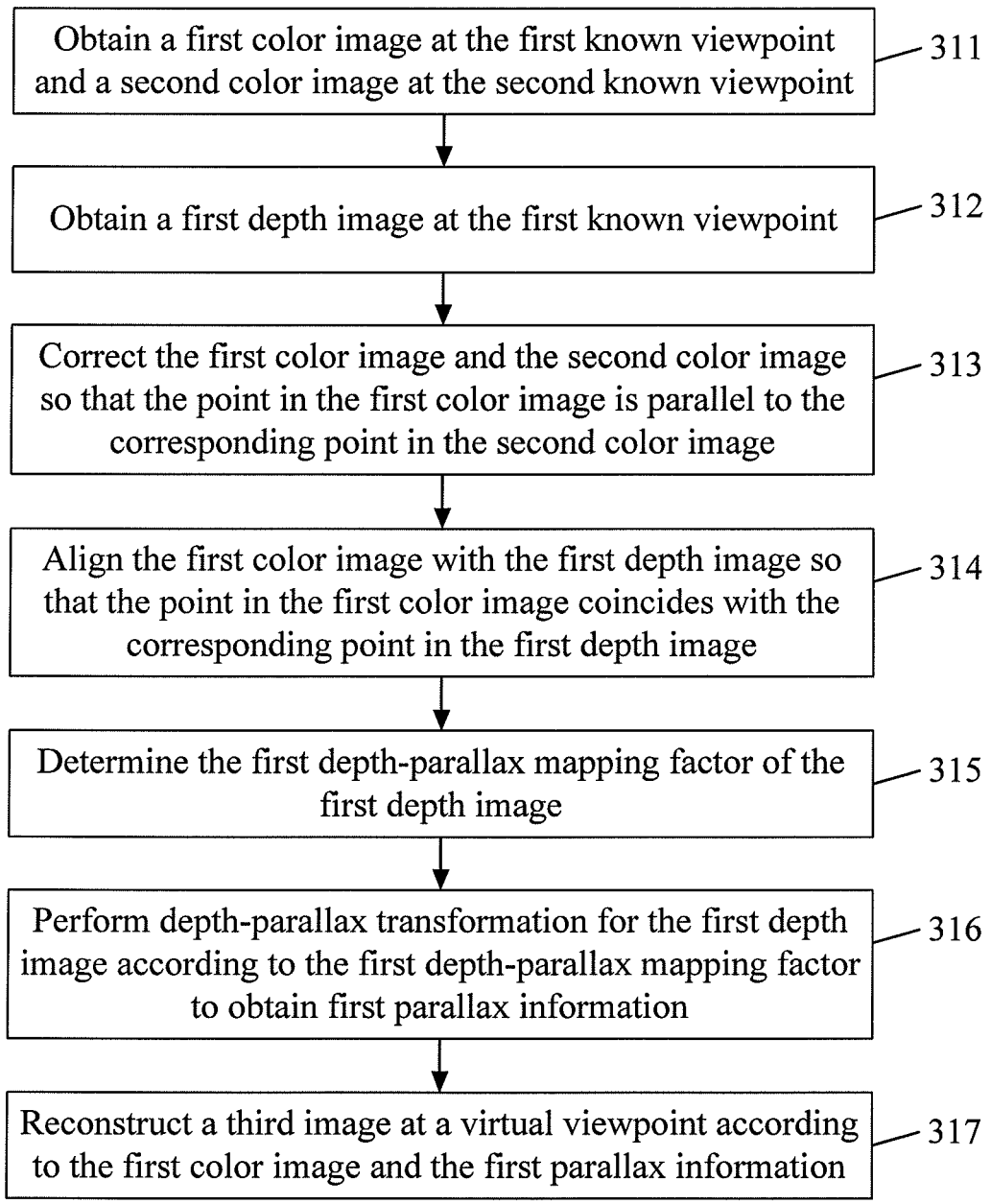
FIG. 10 is a flowchart of an image reconstruction method provided in the second embodiment of the present invention.

FIG. 10 is a flowchart of an image reconstruction method provided in the second embodiment of the present invention. On the basis of the first embodiment of the image reconstruction method above, if a point in an image obtained by an ordinary image collecting apparatus does not coincide with the corresponding point in the depth image obtained by the depth image collecting apparatus, or if two images obtained by the ordinary image collecting apparatus are not parallel, the image reconstruction method needs to include step 313 and step 314 before determining the depth-parallax mapping factor. Specifically, the method in this embodiment may include the following steps:

Step 311: Obtain a first color image at a first known viewpoint and a second color image at a second known viewpoint.

An ordinary image collecting apparatus obtains the color images of the scene on the first known viewpoint and the second known viewpoint respectively.

Step 312: Obtain a first depth image at the first known viewpoint.

Step 313: Correct the first color image and the second color image so that the point in the first color image is parallel to the corresponding point in the second color image.

Step 313 may occur after step 311. The sequence of such steps shall not be construed as a limitation to the present invention.

Step 314: Align the first color image with the first depth image so that the point in the first color image coincides with the corresponding point in the first depth image.

Step 315: Determine the first depth-parallax mapping factor of the first depth image.

More specifically, a first depth-parallax mapping factor of the first depth image is determined according to the first color image, the second color image, and the first depth image.

The method for determining the depth-parallax mapping factor has been detailed above.

Step 316: Perform depth-parallax transformation for the first depth image according to the first depth-parallax mapping factor to obtain first parallax information.

The principles and process of performing depth-parallax transformation for the first depth image according to the first depth-parallax mapping factor to obtain first parallax information have been detailed above.

Step 317: Reconstruct a third image at a virtual viewpoint according to the first color image and the first parallax information.

After the depth-parallax mapping factor is determined in step 315, the determined depth-parallax mapping factor can be reused in subsequent image reconstruction. That is, after the depth-parallax mapping factor is determined, step 315 does not need to be performed again.

In this embodiment, the depth images are obtained directly, and the depth images are transformed into parallax information for reconstructing images. Therefore, it is not necessary to obtain parallax information through the 3D matching algorithm or perform massive complicated calculations, and the image reconstruction is more real-time. Because no 3D matching algorithm needs to be performed for reconstructing images, no inter-frame flicker exists, and the quality of reconstructed images is improved.

Figure 11:
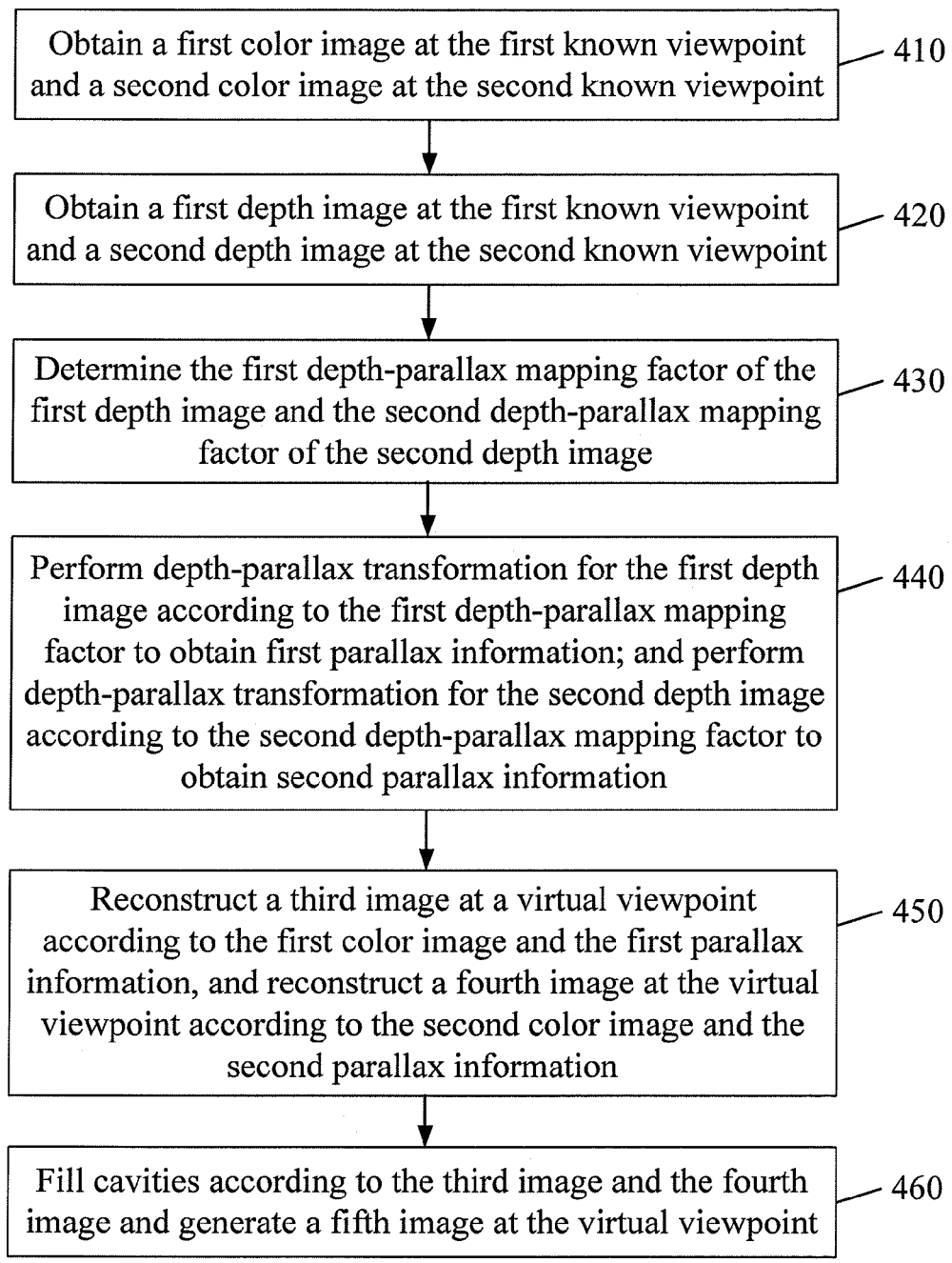
FIG. 11 is a flowchart of an image reconstruction method provided in the third embodiment of the present invention.

FIG. 11 is a flowchart of an image reconstruction method provided in the third embodiment of the present invention. As shown in FIG. 11, the method includes the following steps:

Step 410: Obtain a first color image at a first known viewpoint and a second color image at a second known viewpoint.

An ordinary image collecting apparatus obtains the color images of the scene on the first known viewpoint and the second known viewpoint respectively.

Step 420: Obtain a first depth image at the first known viewpoint and a second depth image at the second known viewpoint.

A depth image collecting apparatus obtains the depth images of the scene on the first known viewpoint and the second known viewpoint respectively.

Step 430: Determine the first depth-parallax mapping factor of the first depth image and the second depth-parallax mapping factor of the second depth image.

More specifically, the first depth-parallax mapping factor of the first depth image is determined according to the first color image, the second color image, and the first depth image.

The second depth-parallax mapping factor of the second depth image is determined according to the first color image, the second color image, and the second depth image.

The method for determining the depth-parallax mapping factor has been detailed above.

Step 440: Perform depth-parallax transformation for the first depth image according to the first depth-parallax mapping factor to obtain first parallax information; and perform depth-parallax transformation for the second depth image according to the second depth-parallax mapping factor to obtain second parallax information.

The principles and process of performing depth-parallax transformation for the depth image according to the depth-parallax mapping factor to obtain parallax information have been detailed above.

Step 450: Reconstruct a third image at a virtual viewpoint according to the first color image and the first parallax information, and reconstruct a fourth image at the virtual viewpoint according to the second color image and the second parallax information.

Step 460: Fill the cavity according to the third image and the fourth image and generate a fifth image at the virtual viewpoint.

If a point in an image obtained by an ordinary image collecting apparatus does not coincide with the corresponding point in the depth image obtained by the depth image collecting apparatus, or if two images obtained by the ordinary image collecting apparatus are not parallel, the image reconstruction method needs to include the following steps before determining the depth-parallax mapping factor:

correct the first color image and the second color image so that the point in the first color image is parallel to the corresponding point in the second color image;

align the first color image with the first depth image so that the point in the first color image coincides with the corresponding point in the first depth image; and align the second color image with the second depth image so that the point in the second color image coincides with the corresponding point in the second depth image.

In this embodiment, the depth images are obtained directly, and the depth images are transformed into parallax information for reconstructing images. Therefore, it is not necessary to obtain parallax information through the 3D matching algorithm or perform massive complicated calculations, the image reconstruction is more real-time, and the quality of reconstructed images is improved. Moreover, with the enough depth images of a scene, the negative effect caused by one object shadowing the other in the scene is overcome. By contrast, if the images are reconstructed through a 3D matching algorithm in the prior art, the negative effect caused by one object shadowing the other in a scene cannot be solved.

It is understandable that in the image reconstruction method disclosed herein, the image at the virtual viewpoint may be reconstructed according to color images and depth images at two viewpoints. Further, the image at the virtual viewpoint may be reconstructed according to color images and depth images at more viewpoints based on the same principles.

Figure 12:
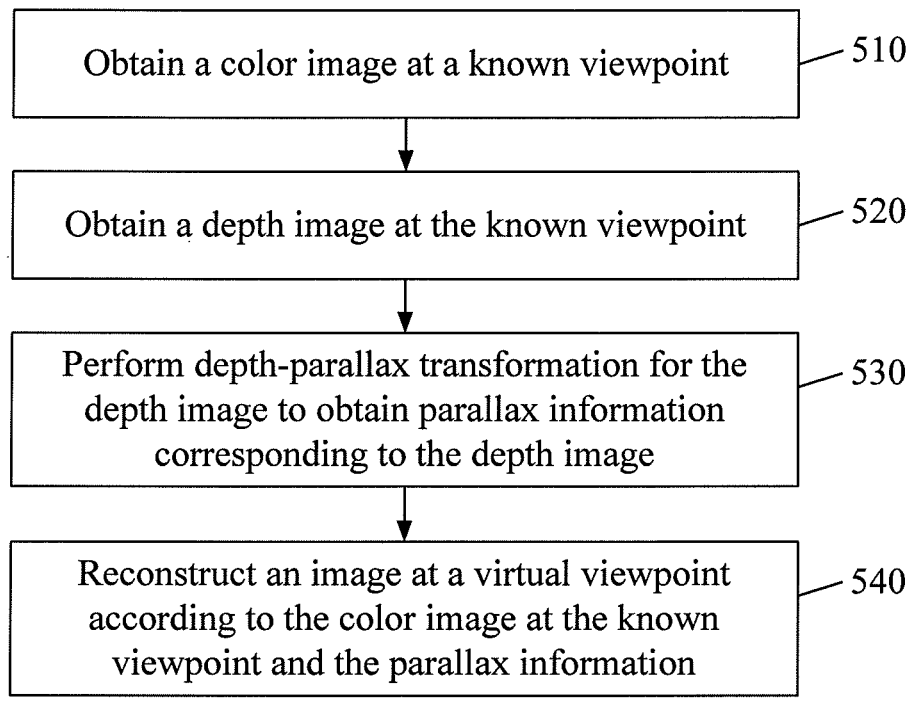
FIG. 12 is a flowchart of an image reconstruction method provided in the fourth embodiment of the present invention.

FIG. 12 is a flowchart of an image reconstruction method provided in the fourth embodiment of the present invention. As shown in FIG. 12, the method in this embodiment may include the following steps:

Step 510: Obtain a color image at a known viewpoint.

Step 520: Obtain a depth image at the known viewpoint.

Step 530: Perform depth-parallax transformation for the depth image to obtain parallax information corresponding to the depth image.

Before performing depth-parallax transformation for the depth image to obtain parallax information corresponding to the depth image, the method further includes the following operation:

determine the depth-parallax mapping factor of the depth image.

In this way, depth-parallax transformation can be performed for the depth image according to the depth-parallax mapping factor to obtain the parallax information corresponding to the depth image.

Step 540: Reconstruct an image at a virtual viewpoint according to the color image at the known viewpoint and the parallax information.

The foregoing embodiment employs color images and depth images at a known viewpoint. It is applicable to generating images of small parallax on other virtual viewpoints, and applicable to 3D display. In the case that a viewpoint is known, it is not necessary to correct the color images.

Figure 13:
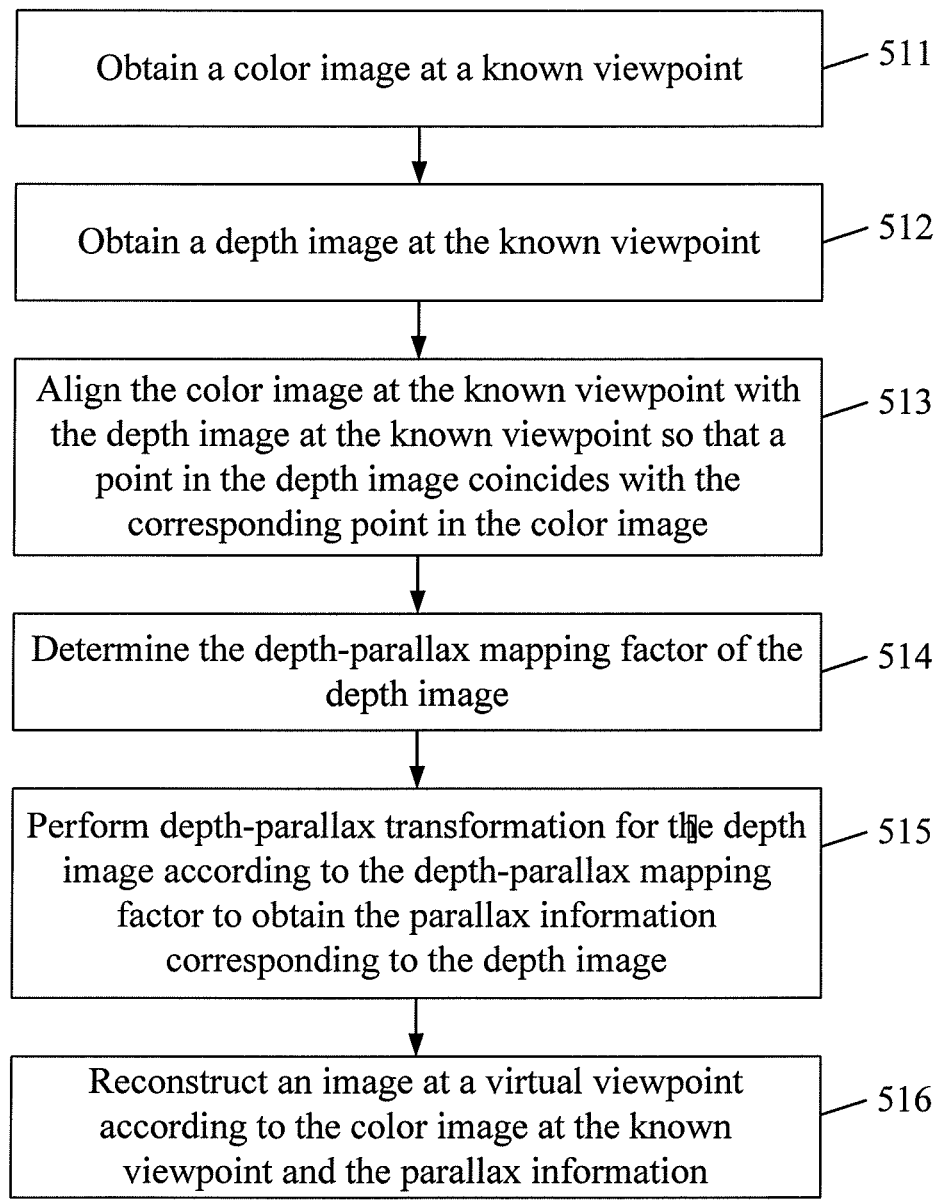
FIG. 13 is a flowchart of an image reconstruction method provided in the fifth embodiment of the present invention.

FIG. 13 is a flowchart of an image reconstruction method provided in the fifth embodiment of the present invention. As shown in FIG. 13, the method may include the following steps:

Step 511: Obtain a color image at a known viewpoint.

Step 512: Obtain a depth image at the known viewpoint.

Step 513: Align the color image at the known viewpoint with the depth image at the known viewpoint so that the point in the depth image coincides with the corresponding point in the color image.

Step 514: Determine the depth-parallax mapping factor of the depth image.

In this embodiment, the depth-parallax mapping factor makes no practical sense. The depth-parallax mapping factor may be selected as required by the application scenario, for example, according to parameters of a 3D display.

Step 515: Perform depth-parallax transformation for the depth image according to the depth-parallax mapping factor to obtain the parallax information corresponding to the depth image.

Step 516: Reconstruct an image at a virtual viewpoint according to the color image at the known viewpoint and the parallax information.

The foregoing embodiment employs color images and depth images at a known viewpoint. It is applicable to generating images of small parallax on other virtual viewpoints, and applicable to 3D display. In the case that a viewpoint is known, it is not necessary to correct the color images, but it is necessary to align the color image with the depth image. The alignment process is the same as that in the previous embodiment. In this embodiment, the depth-parallax mapping factor still needs to be determined, but the depth-parallax mapping factor makes no practical sense. The depth-parallax mapping factor may be selected as required by the application scenario, for example, according to parameters of a 3D display.

Figure 14:
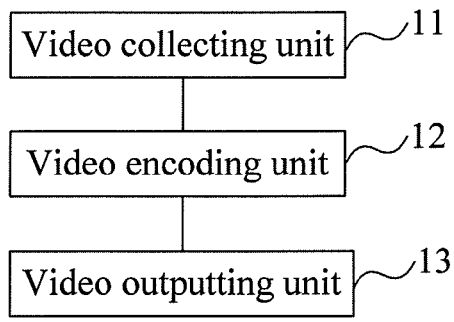
FIG. 14 shows a structure of a 3D video sending device provided in the first embodiment of the present invention.

FIG. 14 shows a structure of a 3D video sending device provided in the first embodiment of the present invention. In this embodiment, the 3D video sending device includes: a video collecting unit 11, adapted to obtain video image data of a scene, where: the video image data includes at least one depth image and at least two color images and is collected by image collecting apparatuses; the video collecting unit 11 includes at least one depth image collecting apparatus capable of outputting depth information of the scene and at least one ordinary image collecting apparatus capable of outputting color/grayscale video information of the scene or includes at least one depth image collecting apparatus capable of outputting both depth information and color/grayscale video information of the scene; a video encoding unit 12, adapted to encode the video image data to obtain encoded video image data; and a video outputting unit 13, adapted to receive the video image data encoded by the video encoding unit 12 and send the encoded video image data.

In this embodiment, the depth image collecting apparatus in the video collecting unit 11 obtains the depth images and/or color images of the scene, and an ordinary image collecting apparatus obtains color images of the scene; the obtained depth images and color images are transmitted as 3D video image data to the video encoding unit 12. The video encoding unit 12 encodes the collected video image data to obtain encoded video image data of the scene, and sends the encoded video image data to the video outputting unit 13; the video outputting unit 13 sends the encoded video image data to the video image receiving device. In this embodiment, a depth image collecting apparatus collects depth images of the scene, and the obtained depth images are accurate and reliable. Moreover, multiple color images or grayscale images of the scene are obtained by depth image collecting apparatuses and/or ordinary image collecting apparatuses. In this way, the 3D video image data on various viewpoints can be obtained on the occasion of reconstructing the 3D video image at each virtual viewpoint. On the occasion of reconstructing the video image at a virtual viewpoint, the depth images and color images collected by the depth image collecting apparatus may be used to reconstruct the image at the virtual viewpoint, and then the reconstructed image is repaired according to the color images collected by the ordinary image collecting apparatus. In this way, the generated cavities are eliminated, and the reconstructed images are more compliant with the authentic effect of the scene and improve the visual experience of users. At the time of collection, the depth image collecting apparatuses and the ordinary image collecting apparatuses may be placed on proper photographing viewpoints. Therefore, the obtained images of the scene include the video images of a wider perspective, the image at the virtual viewpoint in the wider perspective can be reconstructed, and the reconstruction effect is improved.

In this embodiment, the depth image collecting apparatus obtains depth images of the scene, and the obtained depth images are accurate, reliable and highly real-time. The 3D video images at various virtual viewpoints are obtained more accurately according to the depth images, and can reflect the authentic effect of the scene. Meanwhile, the depth image collecting apparatuses and the ordinary image collecting apparatus obtain multiple color images of the scene. On the occasion of reconstructing the 3D video image at the virtual viewpoint, the 3D video data in a wider perspective can be obtained, and the cavity generated in the reconstruction based on a single color image can be repaired. Therefore, the reconstructed 3D video images are more accurate and reflect the effect of the scene more authentically, the effect of reconstructing images at virtual viewpoints is improved, and the 3D video sending device in this embodiment is highly practical.

Figure 15:
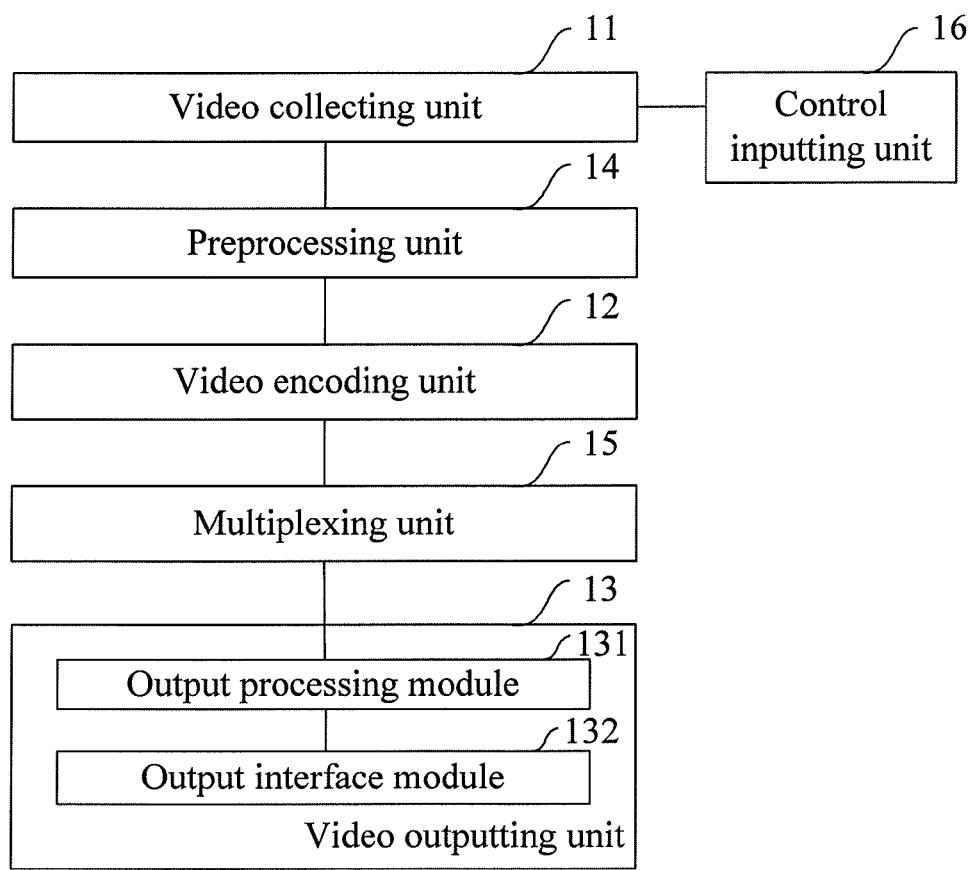
FIG. 15 shows a structure of a 3D video sending device provided in the second embodiment of the present invention.
Figure 16:
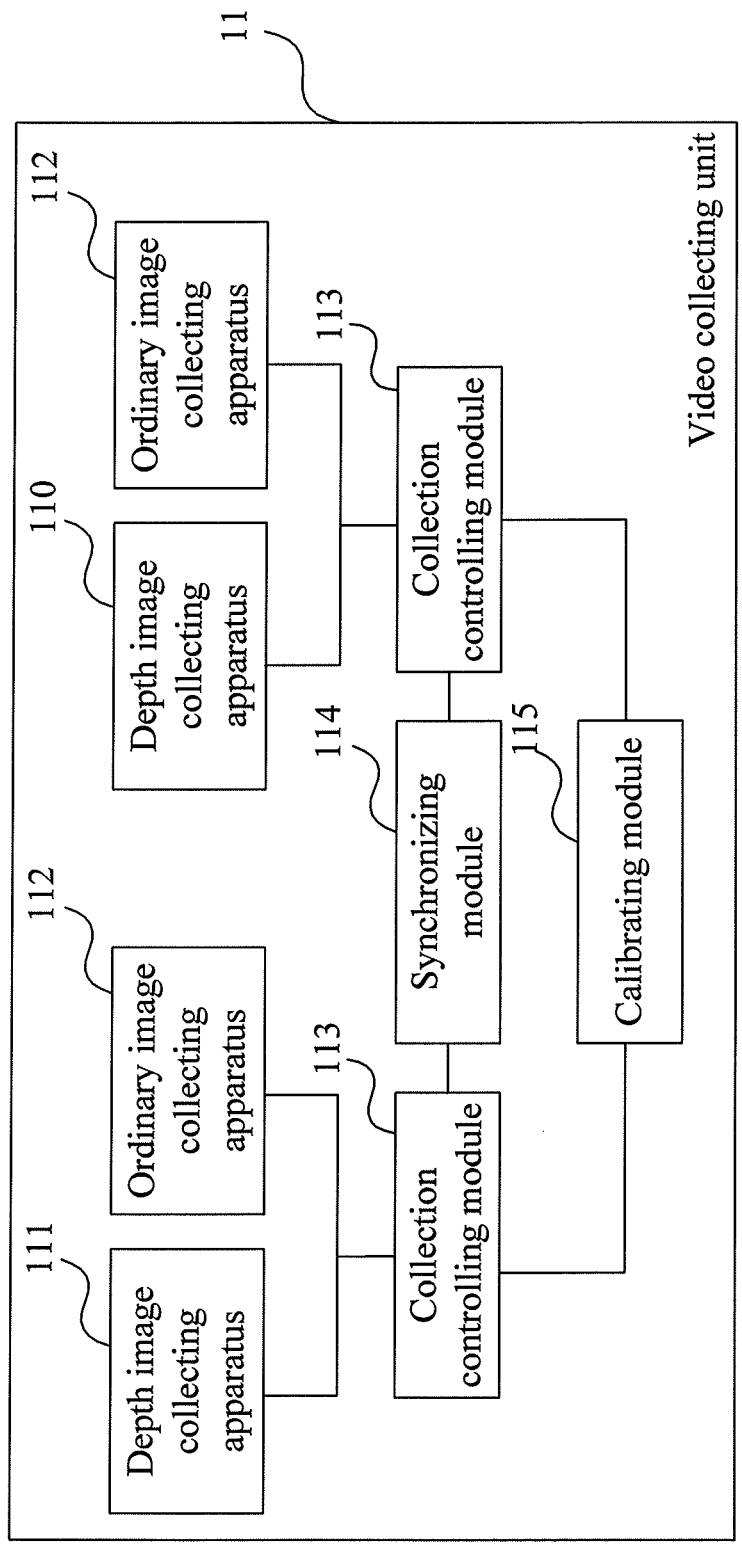
FIG. 16 shows a structure of a video collecting unit in a 3D video sending device provided in an embodiment of the present invention.
Figure 17A:
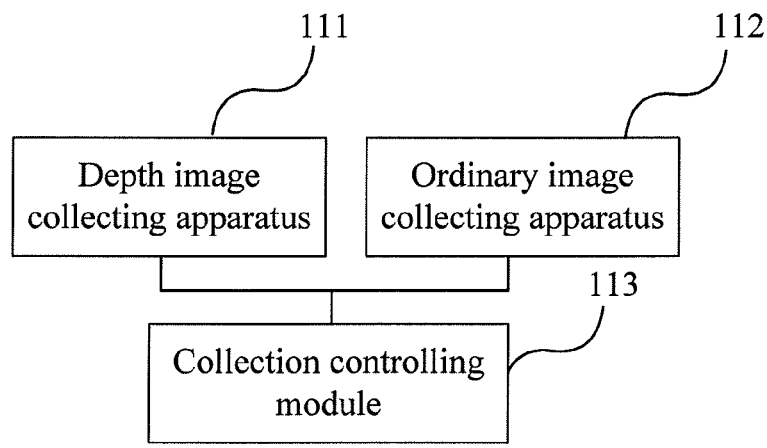
FIG. 17A to FIG. 17C show how image collecting apparatuses are combined in a 3D video sending device and how they are connected to a collection controlling module.
Figure 17B:
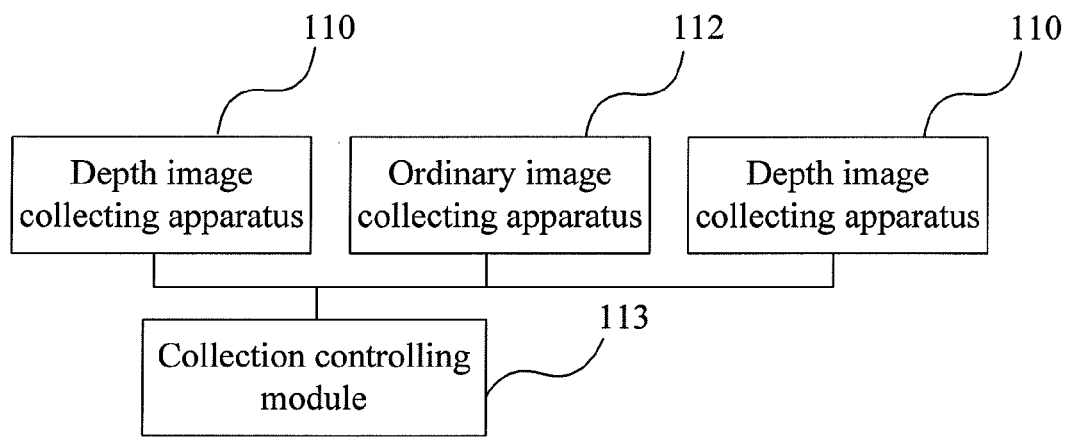
Figure 17C:
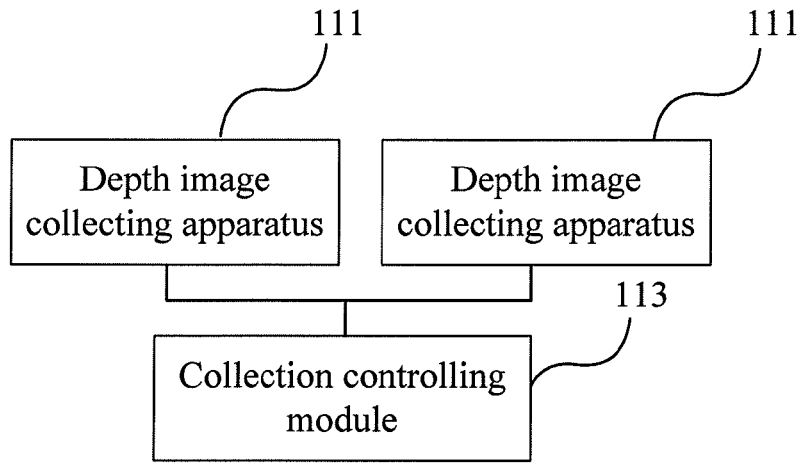

FIG. 15 shows a structure of a 3D video sending device provided in the second embodiment of the present invention; and FIG. 16 shows a structure of a video collecting unit in a 3D video sending device provided in an embodiment of the present invention. FIG. 17A to FIG. 17C show how image collecting apparatuses are combined in a 3D video sending device and how they are connected to a collection controlling module. On the basis of the first embodiment of the 3D video sending device, as shown in FIG. 16, the video collecting unit 11 in this embodiment may include a depth image collecting apparatus 110 capable of outputting depth images of the scene, or a depth image collecting apparatus 111 capable of outputting both depth images and color images of the scene, and further includes an ordinary image collecting apparatus 112 capable of outputting color images or grayscale images of the scene. The video collecting unit 11 in this embodiment further includes at least one collection controlling module 113, which is adapted to control the image collecting apparatus connected to it to photograph the scene, and collect and output the video image data obtained in the photographing. As shown in FIG. 17A to FIG. 17C, the depth image collecting apparatus 111 can output both depth images and color images of the scene, but the ordinary image collecting apparatus 112 can output only color images or grayscale images of the scene, and the depth image collecting apparatus 110 can output only depth images of the scene. The collection controlling module 113 can be connected to any of the image collecting apparatuses in the following way:

(a) As shown in FIG. 17A, the collection controlling module 113 is connected to a depth image collecting apparatus 111 and an ordinary image collecting apparatus 112.

(b) As shown in FIG. 17B, the collection controlling module 113 is connected to a depth image collecting apparatus 110 and two ordinary image collecting apparatuses 112.

The depth image collecting apparatus 110 and the ordinary image collecting apparatus 112 may be placed randomly. However, to obtain the maximum perspective, the depth image collecting apparatus 110 may be placed in an ordinary image collecting apparatus 112. In this way, the perspective of the depth image and the color image of the scene is wider, the 3D video images at the virtual viewpoints in a wider range can be reconstructed, and the effect of the synthesized 3D video image at each virtual viewpoint is better.

(c) As shown in FIG. 17C, the collection controlling module 113 is connected to two or more depth image collecting apparatuses 111.

Multiple depth image collecting apparatuses 111 can obtain more depth images of a scene and the color images corresponding to the depth images. Therefore, a wider scene scope can be obtained at the time of reconstructing the images at virtual viewpoints in the scene, and the video data obtained by the depth image collecting apparatuses can serve as a reference to each other, thus improving precision of reconstructed images at virtual viewpoints.

The foregoing connection between the collection controlling module 113 and a combination of image collecting apparatuses is the basic connection mode. They may be combined in other modes randomly, or more image collecting apparatuses are added as required to achieve better 3D video data of the scene. However, on the occasion of collecting the video of the scene, the output video image data needs to include at least one depth image and multiple color images of the scene.

As shown in FIG. 16, to reduce the deployment cost of the system and ensure the quality of video collection, this embodiment uses a hybrid video collecting unit 11 based on two basic combination modes (a) and (b) above. The hybrid video collecting unit 11 includes two collection controlling modules 113. One of the collection controlling modules 113 is connected to a depth image collecting apparatus 111 and an ordinary image collecting apparatus 112. The other collection controlling module 113 is connected to a depth image collecting apparatus 110 and an ordinary image collecting apparatus 112. At the time of collecting video images of a scene, the viewpoints of photographing of the image collecting apparatuses may be allocated properly. In this way, the collected depth images and color images of the scene have good perspectives, and the effect of the reconstructed images at the virtual viewpoints in the scene is ensured. It is understandable that, if the collection controlling module 113 is connected to more image collecting apparatuses and if more collection controlling modules 113 are deployed, more depth images and color images of the scene will be obtained, the perspective of the scene will be wider, and the effect of the reconstructed video images at virtual viewpoints in the scene will be better. The proper combination of image collecting apparatuses and the proper connection mode can be selected as required.

In this embodiment, as shown in FIG. 16, the video collecting unit 11 may further include a synchronizing module 114 and a calibrating module 115. The synchronizing module 114 is adapted to generate synchronization signals, and output the synchronization signals to the collection controlling module 113, whereupon the collection controlling module 113 controls all image collecting apparatuses to photograph the scene synchronously; or adapted to output the synchronization signals to an external synchronization interface of each image collecting apparatus so that all image collecting apparatuses photograph the scene synchronously. The synchronization signals are generated by the synchronizing module 114 itself or are video output signals generated by an image collecting apparatus in the image collection process. The calibrating module 115 is adapted to: receive the video images collected by the image collecting apparatuses, calibrate the image collecting apparatuses according to the collected video images, obtain internal parameters and external parameters of each image collecting apparatus, and send them to the collection controlling module 113. The collection controlling module 113 is further adapted to set up a mapping relation between the collected video image and the properties of each image collecting apparatus according to the internal parameters and external parameters, and output the mapping relation as video image data of the scene, where the properties of the image collecting apparatus include internal parameters and external parameters of the image collecting apparatus, and the collecting timestamp of each frame of the video image. Through the synchronizing module 114, all image collecting apparatuses perform collection synchronously, and the collected video images are synchronized. Besides, through calibration of the image collecting apparatuses, internal parameters and external parameters of the image collecting apparatuses can be obtained and used as a reference basis for correcting the video images. The video images obtained by different video image collecting apparatuses are corrected to ensure a good effect of reconstructing the virtual viewpoints.

As shown in FIG. 15, the 3D video image communication device in this embodiment may further include a preprocessing unit 14, which is adapted to: receive video images collected by image collecting apparatuses from the collection controlling module 113, properties of the image collecting apparatuses, and the video image data that includes the mapping relation between the video image and the properties of the image collecting apparatus; correct the video image data according to internal parameters and external parameters of the image collecting apparatus, and output the corrected video image data. The video encoding unit 12 receives the video image data corrected by the preprocessing unit 14, and encodes the corrected video image data. Each collection controlling module 113 is connected to the corresponding preprocessing unit 14. In this way, the video image data collected by each collection controlling module 113 can be processed quickly and accurately, and the data processing efficiency is improved.

In this embodiment, as shown in FIG. 15, the video outputting unit 13 may include an output processing module 131 and an output interface module 132. The output processing module 131 is adapted to receive the video image data encoded by the video encoding unit 12, and packetize the encoded video image data. The output interface module 132 is adapted to send the packets. The sending device in this embodiment may further include a multiplexing unit 15, which is adapted to multiplex the encoded video image data and obtain the multiplexed data. The output processing module 131 is further adapted to receive multiplexed data, and packetize the multiplexed data.

The sending device in this embodiment may further include: an audio encoding unit, adapted to encode voice data and send it to the output processing module 131; a system controlling unit, adapted to send the command data to the output processing module 131, and a user data unit, adapted to send file data to the output processing module 131. The output processing module 131 is further adapted to packetize the received encoded voice data, command data and/or file data and send the packets to the output interface module 132. In this embodiment, an audio encoding unit transmits the local voice information along with video information to the video receiver, thus making the 3D video more practical. Besides, local file data and command information can also be sent to the video receiver to meet different requirements of the user. The sending device in this embodiment may further include a control inputting unit 16, which is connected to the collection controlling module 113 in the video collecting unit 11, and is adapted to obtain control information and send the control information to the collection controlling module. The control information may include information such as the watching viewpoint or display viewpoint, display distance, and display mode. The control information (such as the watching viewpoint or display viewpoint, display distance, and display mode) may be input by the user through a Graphical User Interface (GUI) or a remote control device. The collection controlling module 113 can be controlled according to such control information. If the display mode requires only 2D video display, the collection controlling module 113 is required to select only the ordinary image collecting apparatus for photographing the scene and collecting the images. If the display mode requires 3D video display, the depth image collecting apparatus and the ordinary image collecting apparatus may photograph the scene and collect the images together, and only a part of the image collecting apparatuses are selected for photographing the scene and collecting the images according to the watching viewpoint or display viewpoint, thus improving the image collection efficiency and avoiding inconvenience of data transmission and processing caused by too much futile or repeated data collected.

To make the embodiments of the present invention clearer, the following gives details about the main functional modules or units involved herein:

Collection Controlling Module 113

The collection controlling module is adapted to control the connected image collecting apparatuses to collect and output video images. The collection controlling module can convert analog image signals into digital video image signals or receive digital image signals directly, and can store the collected image data in a buffer of the collection controlling module in the form of frames. The collection controlling module is further adapted to provide the collected video data to the calibrating module for calibrating the image collecting apparatus. The calibrating module returns the obtained calibration information such as internal parameters and external parameters of the image collecting apparatus to the corresponding collection controlling module. The collection controlling module sets up one-to-one relations between the video image data and the properties of the image collecting apparatus according to the calibration information of the image collecting apparatus. The properties of the image collecting apparatus include a unique code of the image collecting apparatus, internal parameters and external parameters of the image collecting apparatus, and the collecting timestamp of each frame. Moreover, the collection controlling module outputs the properties of the image collecting apparatus and the video image data in a specific format. Meanwhile, the collection controlling module can pan, tilt, or zoom the image collecting apparatus through the remote control interface of the image collecting apparatus according to the calibration information of the image collecting apparatus, and provide synchronous moderate signals to the image collecting apparatus through the synchronization interface of the image collecting apparatus to control synchronous collection of the image collecting apparatuses. The collection controlling module may further select a part of the image collecting apparatuses to collect images according to the watching viewpoints or display viewpoints received by the control inputting unit, and shut down the unnecessary depth image collecting apparatuses to avoid repeated or futile collection.

Synchronizing Module 114

The synchronizing module is adapted to control multiple image collecting apparatuses to collect images synchronously. For an object that moves at a high speed, synchronous collection is essential. If the collection is not synchronous, the images at different viewpoints or the same viewpoint vary sharply at the same moment, and the 3D video watched by the user is distorted. The synchronizing module may generate synchronization signals through hardware or software clocks, and output the synchronization signals to the external synchronization interface of the image collecting apparatus to control synchronous collection of the image collecting apparatuses, or output the synchronization signals to the collection controlling module which controls synchronous collection of the image collecting apparatuses through a control line. The synchronizing module may also use the video output signals of one image collecting apparatus as control signals, and input them into other image collecting apparatuses to control synchronous collection. Synchronous collection can implement frame synchronization or line/field synchronization.

Calibrating Module 115

The calibrating module calibrates the image collecting apparatus, namely, obtains internal parameters and external parameters of the image collecting apparatus. Internal parameters include imaging center, focal length, and lens distortion of the image collecting apparatus, and external parameters include tilt and pan of the position of the image collecting apparatus. The images obtained by multiple image collecting apparatuses are generally not aligned with the scan line, and not compliant with the imaging model of human eyes, which causes visual fatigue to users. Therefore, the images obtained by the image collecting apparatus need to be corrected so that they comply with the imaging model of human eyes. The correction may be based on the internal parameters and external parameters of the image collecting apparatus as a result of calibrating the image collecting apparatus.

When the image collecting apparatus collects 3D video images, according to the principles of affine transformation, the ideal imaging equation for a specific point without considering distortion is:

$$\begin{bmatrix} u \\ v \\ 1 \end{bmatrix} = K[R \quad t] \begin{bmatrix} X_w \\ Y_w \\ Z_w \end{bmatrix}$$

-continued $$K = \begin{bmatrix} fs & 0 & u_0 \\ 0 & f & v_0 \\ 0 & 0 & 1 \end{bmatrix}$$

In the equation above, u, v are coordinates of the imaging point; $X_w, Y_w, Z_w$ are the world coordinates; s is a dimensional factor of the image and is equal to the ratio of the number of horizontal unit pixels $f_u$ to the number of vertical unit pixels $f_v$ of the image; f is focal length; $u_0$, $v_0$ are coordinates of the image center; R is a rotation matrix of the image collecting apparatus; and t is a pan vector of the image collecting apparatus. K is an internal parameter of the image collecting apparatus, and R and t are external parameters of the image collecting apparatus.

The calibration of the image collecting apparatus may be traditional calibration or self-calibration. The traditional calibration includes DLT calibration, RAC-based calibration, and planar calibration. The basic principles of traditional calibration are as follows: use a calibration reference object to set up linear equations of an imaging model of the image collecting apparatus, work out the world coordinates of a group of points in the reference object and the corresponding coordinates of the points on the imaging plane, and then substitute values of the coordinates into the linear equations to work out the internal parameters and external parameters. Self-calibration refers to calibrating the image collecting apparatus through the mapping relation between the imaging points without involving any reference object. The self-calibration is based on the special constraint relation (such as a polar line constraint) between the imaging points in multiple images, and does not require structure information of the scene.

Preprocessing Unit 14

The preprocessing unit receives buffered images and the corresponding image collecting apparatus parameters from the collection controlling module, and processes the buffered images according to the preprocessing algorithm. The preprocessing includes the following contents:

(1) Correct the color images and depth images according to information obtained through calibration of the image collecting apparatus, and align the color image with the depth image. For ease of reconstructing the image at a viewpoint, the content of the color image should be the same as the content of depth image at this viewpoint. However, it is not possible for the position of an ordinary image collecting apparatus to coincide with the position of a depth image collecting apparatus exactly. Therefore, color images and depth images need to be transformed according to results of calibrating the image collecting apparatus to make the color image coincide with the depth image exactly.

(2) Eliminate the image difference brought by different image collecting apparatuses. Different image collecting apparatuses may be adjusted to remove the difference of luminance and chrominance of color images caused by setting, so that chrominance of the color images obtained by different image collecting apparatuses is unified.

(3) Correct the color images or depth images according to calibration parameters of the image collecting apparatus. For example, perform correction such as radial distortion for the images.

Video Encoding Unit 12

In a 3D video system, the video data of images of multiple channels exists, and the size of the video data is very large, which baffles the transmission and storage of video data. Therefore, an efficient video encoding unit is required for processing the video data. Currently, 3D video encoding is categorized into block-based encoding and object-based encoding. In the 3D image encoding, intra-frame prediction and inter-frame prediction eliminate the data redundancy in the space domain and time domain, and it is also necessary to eliminate the space domain data redundancy between multi-channel images. Parallax estimation and compensation can eliminate the space domain redundancy between multi-channel images. The essence of parallax estimation and compensation is to find the correlation between two or more images. The parallax estimation and compensation are similar to but more complex than the motion estimation and compensation. The motion estimation and compensation process asynchronous images collected by the same image collecting apparatus; but the parallax estimation and compensation process synchronous images collected by different image collecting apparatuses. In the parallax estimation and compensation, it is possible that the positions of all pixels are changed, and the parallax of the object in the far distance may be regarded as 0.

The video encoding unit in this embodiment may use an encoding and decoding standard such as MPEG-4 and H.264 to encode the color images and depth images output by the preprocessing unit. The depth may be expressed through the MPEG standard. Currently, many methods are available to encode data of color images and depth images, for example, a 3D video encoding method based on layering. This method combines SEI information in the H.264 protocol with the layered encoding conception, encodes the video data of a channel (such as color image data of the channel) into a basic layer inclusive of only I frames and P frames through a general method, and then encodes the data of another channel (such as depth image data) into P frames. The reference frame applied in the prediction is a previous frame in this channel or the corresponding frame in the basic layer. In this way, high 2D/3D compatibility is achieved in the decoding. For traditional 2D display, it is only necessary to decode the basic layer data; for 3D display, it is necessary to decode all data.

Control Inputting Unit 16

The control inputting unit is adapted to receive input from the video user or video terminal, and feed back the input to the video collecting unit and the video encoding unit. The control inputting unit includes information such as the watching viewpoint and display viewpoint, display mode, and user distance. The information (such as the watching viewpoint and display viewpoint, display mode, and distance information) in the control inputting unit may be input by the user through a GUI or a remote control device. Besides, the control inputting unit can control the image collecting apparatuses selectively according to information such as watching viewpoints, for example, select only one or more of the image collecting apparatuses in the video collecting unit to collect video images. Meanwhile, if the display mode received by the control inputting unit is 2D display, the control inputting unit controls the video encoding unit in the image processing unit to encode only the color images required by 2D display; if the display mode received by the control inputting unit is 3D display, the control inputting unit controls the video encoding unit to encode the output data of color images and depth images.

In this embodiment, a collection controlling module controls the image collecting apparatuses to collect images, and deploys the photographing perspective of the image collecting apparatus in the process of collection. Therefore, the 3D video data of the scene in a wider perspective is obtained, and the effect of reconstructing the images at virtual viewpoints in the scene is good. A synchronizing module and a calibrating module obtain the synchronous video data and the calibration parameters of the image collecting apparatuses so that the collected video images are processed more accurately. Meanwhile, the video data is encoded to facilitate storage and transmission of massive data. This embodiment further improves the precision of video collection and processing, and improves the effect of reconstructing video images at virtual viewpoints.

Figure 18:
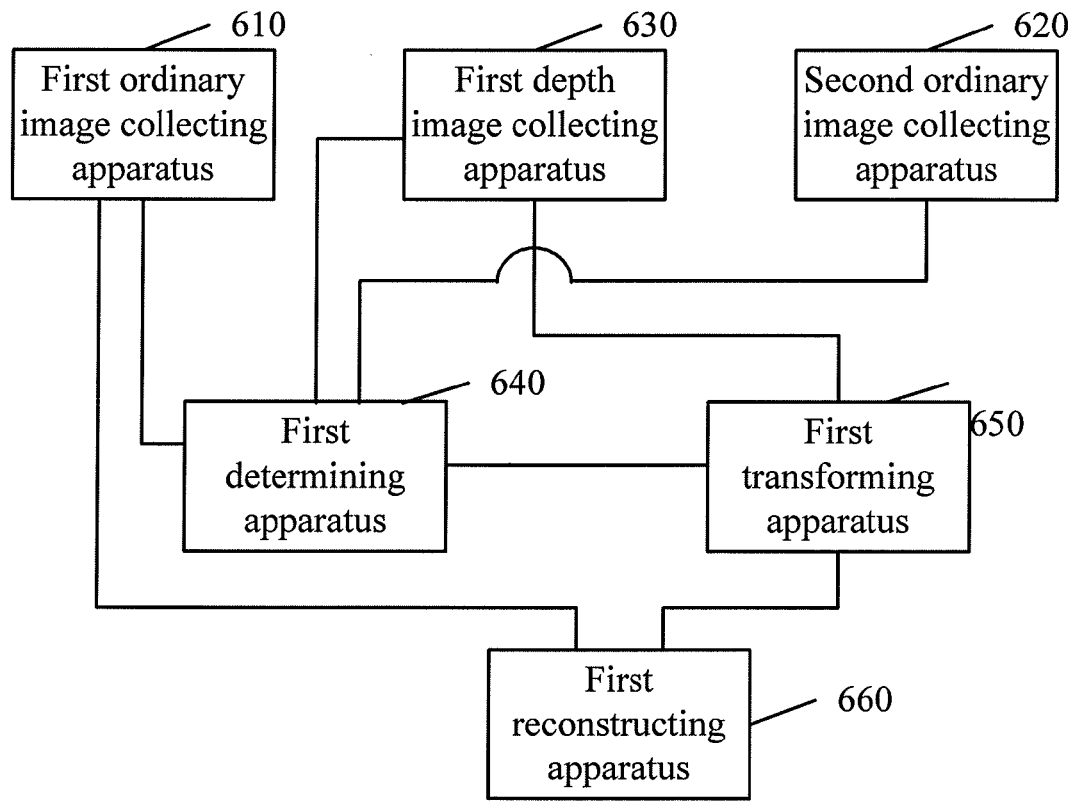
FIG. 18 shows a structure of an image reconstruction system provided in the first embodiment of the present invention.

FIG. 18 shows a structure of an image reconstruction system provided in the first embodiment of the present invention. As shown in FIG. 18, the image reconstruction system may include:

a first ordinary image collecting apparatus 610, adapted to obtain a first color image at a first known viewpoint;

a second ordinary image collecting apparatus 620, adapted to obtain a second color image at a second known viewpoint;

a first depth image collecting apparatus 630, adapted to obtain a first depth image at the first known viewpoint;

a first determining apparatus 640, adapted to determine a first depth-parallax mapping factor of the first depth image according to the first color image, the second color image, and the first depth image;

a first transforming apparatus 650, adapted to perform depth-parallax transformation for the first depth image according to the first depth-parallax mapping factor to obtain first parallax information; and a first reconstructing apparatus 660, adapted to reconstruct a third image at a virtual viewpoint according to the first color image and the first parallax information.

For the working process and the working principles of the image reconstruction system, see the image reconstruction method embodiment above.

In this embodiment, the depth images are obtained directly, and the depth images are transformed into parallax information for reconstructing images. Therefore, it is not necessary to obtain parallax information through the 3D matching algorithm or perform massive complicated calculations, and the image reconstruction is more real-time. Because no 3D matching algorithm needs to be performed for reconstructing images, no inter-frame flicker exists, and the quality of reconstructed images is improved.

Figure 19:
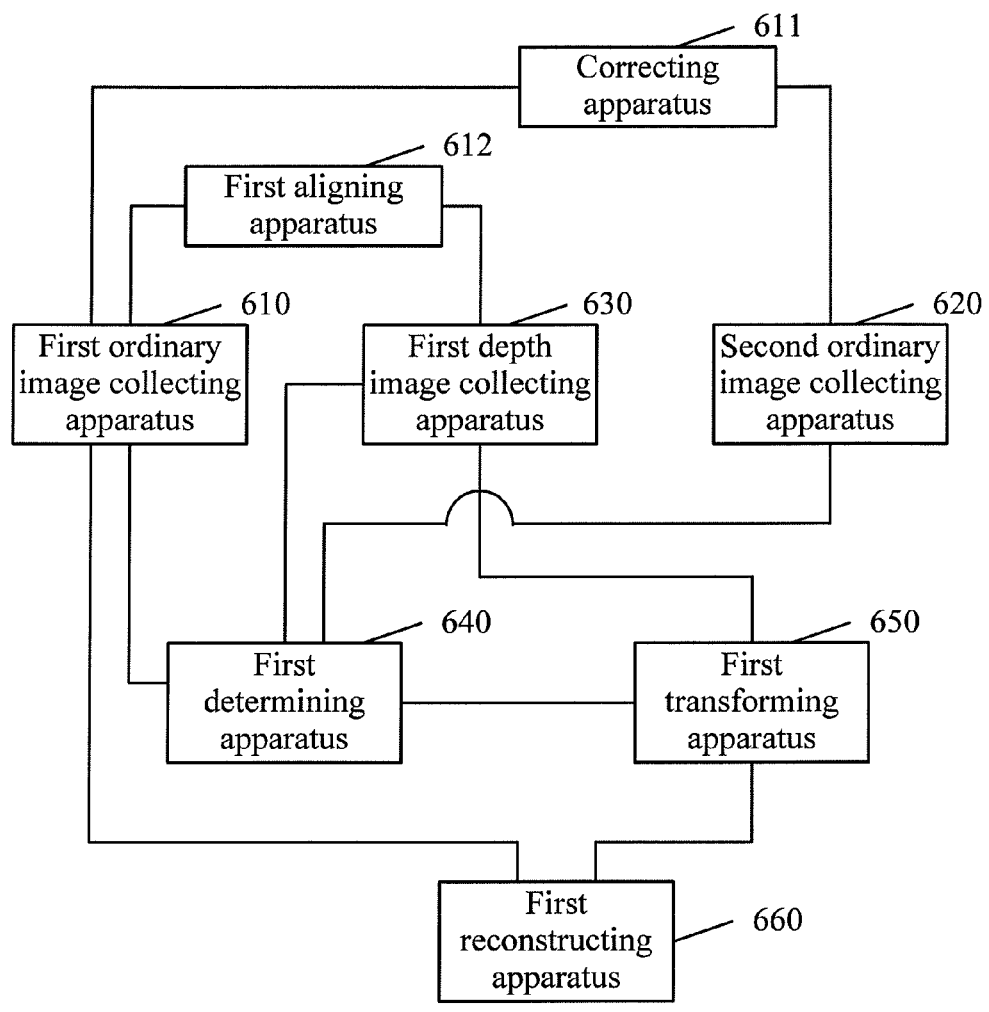
FIG. 19 shows a structure of an image reconstruction system provided in the second embodiment of the present invention.

FIG. 19 shows a structure of an image reconstruction system provided in the second embodiment of the present invention. On the basis of the technical solution in first embodiment above, if a point in an image obtained by an ordinary image collecting apparatus does not coincide with the corresponding point in the depth image obtained by the depth image collecting apparatus, or if two images obtained by the ordinary image collecting apparatus are not parallel, the image reconstruction system in this embodiment may further include a correcting apparatus 611 and a first aligning apparatus 612. Specifically, the image reconstruction system in this embodiment may include:

a first ordinary image collecting apparatus 610, adapted to obtain a first color image at a first known viewpoint;

a second ordinary image collecting apparatus 620, adapted to obtain a second color image at a second known viewpoint;

a first depth image collecting apparatus 630, adapted to obtain a first depth image at the first known viewpoint;

a correcting apparatus 611, adapted to correct the first color image and the second color image so that the point in the first color image is parallel to the corresponding point in the second color image;

a first aligning apparatus 612, adapted to align the first color image with the first depth image so that the point in the first color image coincides with the corresponding point in the first depth image;

a first determining apparatus 640, adapted to determine a first depth-parallax mapping factor of the first depth image according to the first color image, the second color image, and the first depth image;

a first transforming apparatus 650, adapted to perform depth-parallax transformation for the first depth image according to the first depth-parallax mapping factor to obtain first parallax information; and a first reconstructing apparatus 660, adapted to reconstruct a third image at a virtual viewpoint according to the first color image and the first parallax information.

In this embodiment, the depth images are obtained directly, and the depth images are transformed into parallax information for reconstructing images. Therefore, it is not necessary to obtain parallax information through the 3D matching algorithm or perform massive complicated calculations, and the image reconstruction is more real-time. Because no 3D matching algorithm needs to be performed for reconstructing images, no inter-frame flicker exists, and the quality of reconstructed images is improved.

Figure 20:
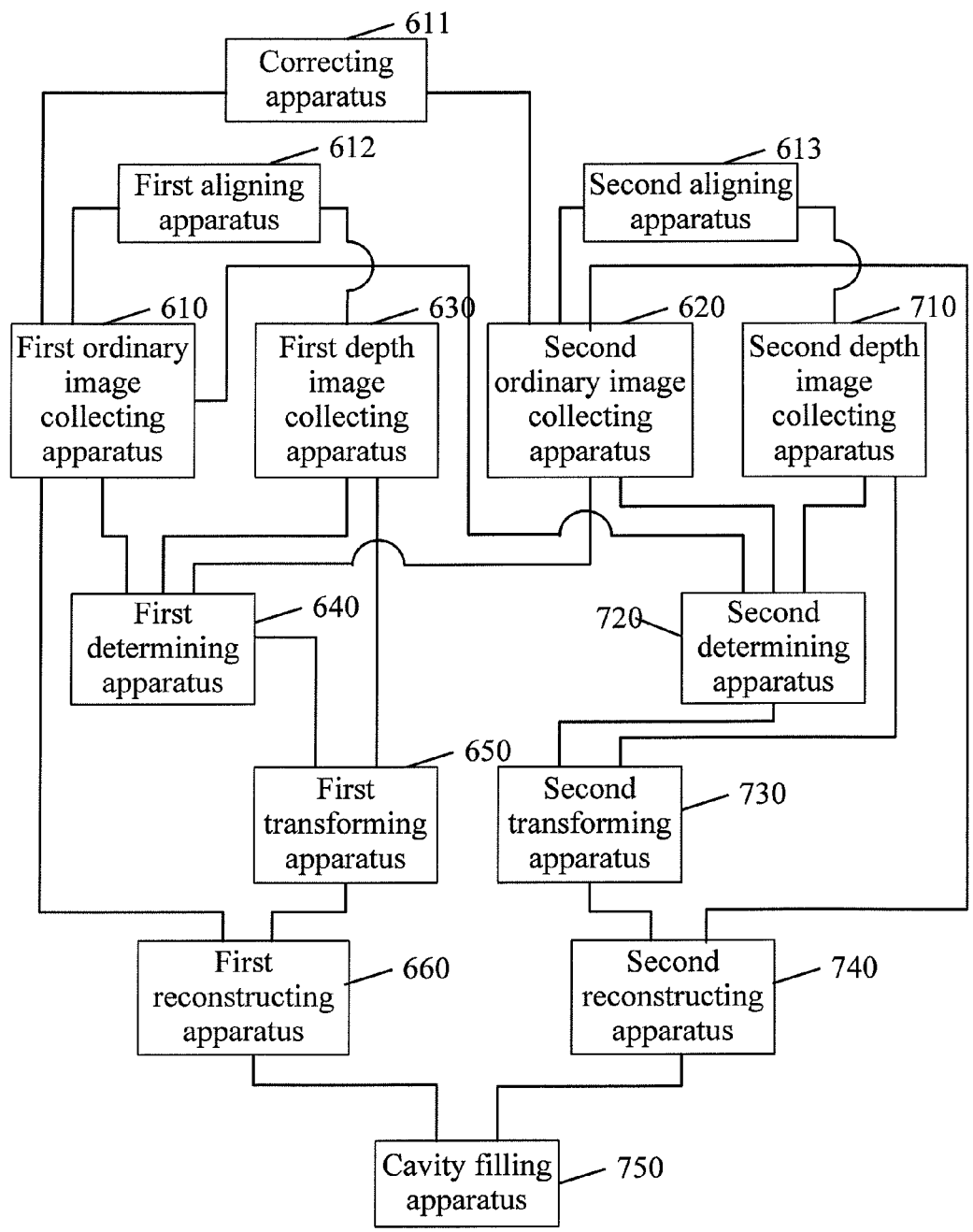
FIG. 20 shows a structure of an image reconstruction system provided in the third embodiment of the present invention.

FIG. 20 shows a structure of an image reconstruction system provided in the third embodiment of the present invention. On the basis of the technical solution in the second embodiment, the third embodiment may further include:

a second depth image collecting apparatus 710, adapted to obtain a second depth image at the second known viewpoint;

a second determining apparatus 720, adapted to determine a second depth-parallax mapping factor of the second depth image according to the first color image, the second color image, and the second depth image;

a second transforming apparatus 730, adapted to perform depth-parallax transformation for the second depth image according to the second depth-parallax mapping factor to obtain second parallax information;

a second reconstructing apparatus 740, adapted to reconstruct a fourth image at a virtual viewpoint according to the second color image and the second parallax information; and a cavity filling apparatus 750, adapted to fill the cavity according to the third image and the fourth image and generate a fifth image at the virtual viewpoint.

For the working process and the working principles of the image reconstruction system, see the relevant description above.

To make a point in an image obtained by an ordinary image collecting apparatus coincide with the corresponding point in the depth image obtained by the depth image collecting apparatus, the first ordinary image collecting apparatus is preferably combined or mapped to the first depth image collecting apparatus, the second ordinary image collecting apparatus, and the second depth image collecting apparatus.

If a point in an image obtained by an ordinary image collecting apparatus does not coincide with the corresponding point in the depth image obtained by the depth image collecting apparatus, or if two images obtained by the ordinary image collecting apparatus are not parallel, the image reconstruction system further includes:

a correcting apparatus 611, adapted to correct the first color image and the second color image so that the point in the first color image is parallel to the corresponding point in the second color image;

a first aligning apparatus 612, adapted to align the first color image with the first depth image so that the point in the first color image coincides with the corresponding point in the first depth image; and a second aligning apparatus 613, adapted to align the second color image with the second depth image so that the point in the second color image coincides with the corresponding point in the second depth image.

In this embodiment, the depth images are obtained directly, and the depth images are transformed into parallax information for reconstructing images. Therefore, it is not necessary to obtain parallax information through the 3D matching algorithm or perform massive complicated calculations, the image reconstruction is more real-time, and the quality of reconstructed images is improved. Moreover, with enough depth images of a scene, the negative effect caused by one object shadowing the other in the scene is overcome. By contrast, if the images are reconstructed through a 3D matching algorithm in the prior art, the negative effect caused by one object shadowing the other in a scene cannot be solved.

Figure 21:
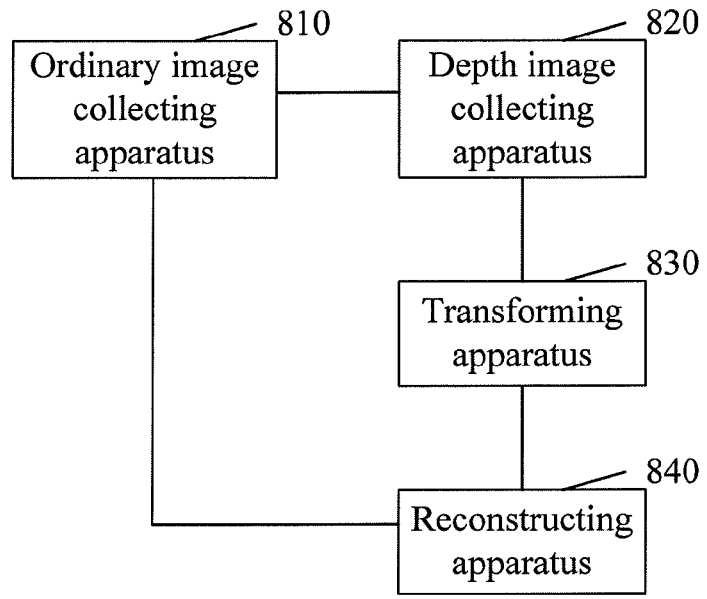
FIG. 21 shows a structure of an image reconstruction system provided in the fourth embodiment of the present invention.

FIG. 21 shows a structure of an image reconstruction system provided in the fourth embodiment of the present invention. The system in this embodiment may include:

an ordinary image collecting apparatus 810, adapted to obtain a color image at a known viewpoint;

a depth image collecting apparatus 820, adapted to obtain a depth image at the known viewpoint;

a transforming apparatus 830, adapted to perform depth-parallax transformation for the depth image to obtain parallax information corresponding to the depth image; and a reconstructing apparatus 840, adapted to reconstruct an image at a virtual viewpoint according to the color image at the known viewpoint and the parallax information.

The foregoing embodiment employs color images and depth images at a known viewpoint. It is applicable to generating images of small parallax on other virtual viewpoints, and applicable to 3D display. In the case that a viewpoint is known, it is not necessary to correct the color images.

Figure 22:
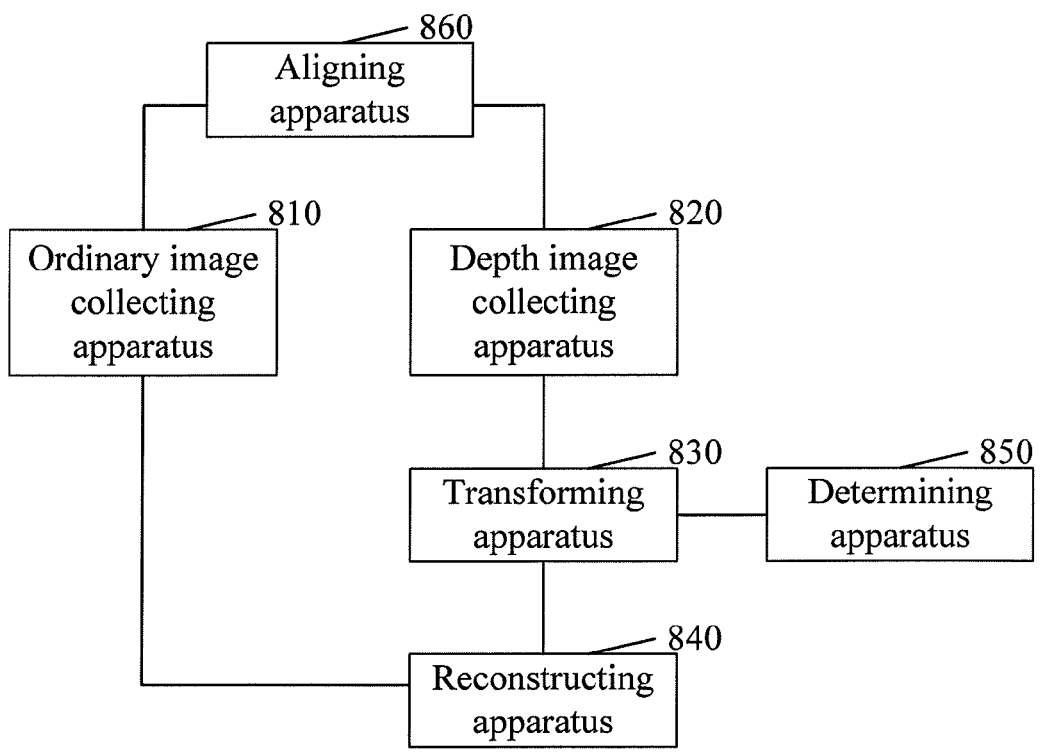
FIG. 22 shows a structure of an image reconstruction system provided in the fifth embodiment of the present invention.

FIG. 22 shows a structure of an image reconstruction system provided in the fifth embodiment of the present invention. The system in this embodiment may include:

an ordinary image collecting apparatus 810, adapted to obtain a color image at a known viewpoint;

a depth image collecting apparatus 820, adapted to obtain a depth image at the known viewpoint;

a transforming apparatus 830, adapted to perform depth-parallax transformation for the depth image to obtain parallax information corresponding to the depth image;

a reconstructing apparatus 840, adapted to reconstruct an image at a virtual viewpoint according to the color image at the known viewpoint and the parallax information;

a determining apparatus 850, adapted to determine the depth-parallax mapping factor of the depth image; and an aligning apparatus 860, adapted to align the image obtained by the ordinary image collecting apparatus with the image obtained by the depth image collecting apparatus so that the position of a point in the depth image is exactly the same as the position of the corresponding point in the image.

The transforming apparatus 830 performs depth-parallax transformation for the depth image according to the depth-parallax mapping factor to obtain the parallax information corresponding to the depth image.

This embodiment employs color images and depth images at a known viewpoint, and is applicable to generating images of small parallax on other virtual viewpoints, and applicable to 3D display. In the case that a viewpoint is known, it is not necessary to correct the color images, but it is necessary to align the color image with the depth image. The alignment process is the same as that in the previous embodiment. In this embodiment, the depth-parallax mapping factor still needs to be determined, but the depth-parallax mapping factor makes no practical sense. The depth-parallax mapping factor may be selected as required by the application scenario, for example, according to parameters of a 3D display.

Figure 23:
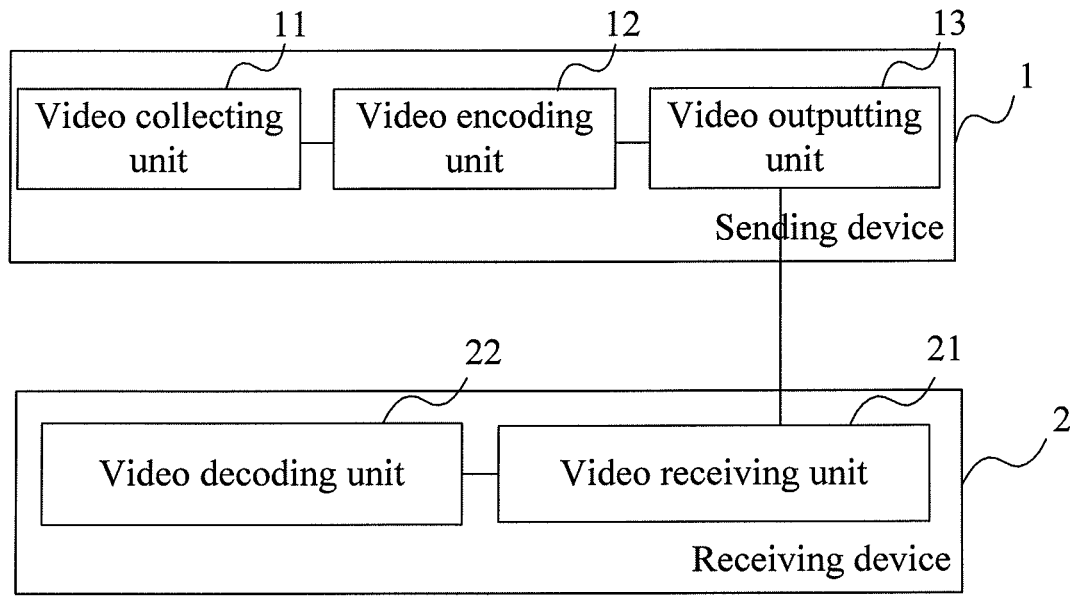
FIG. 23 shows a structure of a 3D video communication system in an embodiment of the present invention.

FIG. 23 shows a structure of a 3D video communication system in an embodiment of the present invention. As shown in FIG. 23, the system in this embodiment includes a sending device 1 and a receiving device 2. The sending device 1 includes: a video collecting unit 11, a video encoding unit 12, and a video outputting unit 13. The video collecting unit 11 is adapted to obtain video image data of a scene, where the video image data includes at least one depth image and at least two color images and is collected by image collecting apparatuses. The video collecting unit 11 includes at least one depth image collecting apparatus capable of outputting depth information of the scene and at least one ordinary image collecting apparatus capable of outputting color/grayscale video information of the scene or includes at least one depth image collecting apparatus capable of outputting both depth information and color/grayscale video information of the scene. The video encoding unit 12 is adapted to encode the video image data to obtain encoded video image data. The video outputting unit 13 is adapted to receive the video image data encoded by the video encoding unit 12 and send the encoded video image data. The receiving device 2 includes: a video receiving unit 21, adapted to receive the encoded video image data sent by the video outputting unit 13; and a video decoding unit 22, adapted to decode the encoded video image data to obtain decoded video image data. The sending device 1 may be connected to the receiving device 2 directly, or connected to the receiving device 2 through an existing communication network such as the Internet.

In this embodiment, the depth image collecting apparatus in the video collecting unit 11 obtains the depth images and/or color images of the scene, and an ordinary image collecting apparatus obtains color images of the scene; the obtained depth images and color images are transmitted as 3D video image data to the video encoding unit 12. The video encoding unit 12 encodes the collected video image data to obtain encoded video image data of the scene, and sends the encoded video image data to the video outputting unit 13; the video outputting unit 13 sends the encoded video image data to the video image receiving device.

In this embodiment, a depth image collecting apparatus collects depth images of the scene, and the obtained depth images are accurate and reliable. Moreover, multiple color images or grayscale images of the scene are obtained by depth image collecting apparatuses and/or ordinary image collecting apparatuses. In this way, the 3D video image data on various viewpoints can be obtained on the occasion of reconstructing the 3D video image at each virtual viewpoint. On the occasion of reconstructing the video image at a virtual viewpoint, the depth images and color images collected by the depth image collecting apparatus may be used to reconstruct the image at the virtual viewpoint, and then the reconstructed image is repaired according to the color images collected by the ordinary image collecting apparatus. In this way, the generated cavities are eliminated, and the reconstructed images are more compliant with the authentic effect of the scene and improve the visual experience of users. At the time of collection, the depth image collecting apparatuses and the ordinary image collecting apparatuses may be placed on proper photographing viewpoints. Therefore, the obtained images of the scene include the video images of a wider perspective, the image at the virtual viewpoint in the wider perspective can be reconstructed, and the reconstruction effect is improved. After receiving the encoded video image data from the sending device 1, the receiving device 2 may perform decoding, video image reconstruction, rendering and display according to the received encoded video image data. Because the depth images in this embodiment are collected by the depth image collecting apparatus, the obtained depth images are of high quality, and the collection of the depth images is highly real-time. On the occasion of reconstructing the 3D video image at each virtual viewpoint in the scene, the depth images and color images collected by the depth image collecting apparatus may be used to reconstruct the image at the virtual viewpoint, and then the reconstructed image is repaired according to the color images collected by the ordinary image collecting apparatus. In this way, the generated cavities are eliminated, and the reconstructed images are more compliant with the authentic effect of the scene and improve the visual experience of users.

Figure 24:
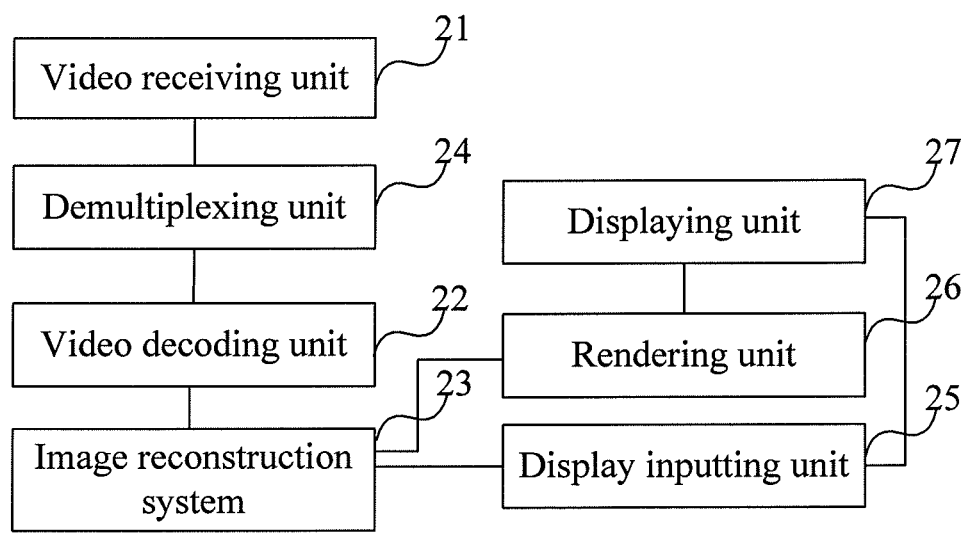
FIG. 24 shows a structure of a receiving device in a 3D video communication system in an embodiment of the present invention.

FIG. 24 shows a structure of a receiving device in a 3D video communication system in an embodiment of the present invention. In this embodiment, the receiving device 2 may further include an image reconstructing system 23, which is adapted to reconstruct video images at the viewpoint to be displayed according to the display information and the decoded video image data. The receiving device 2 in this embodiment may further include a demultiplexing unit 24, which is adapted to demultiplex the multiplexed data received by the video receiving unit 21. The multiplexed data is a result of multiplexing the encoded video image data. The image reconstruction system 23 may receive the decoded video image data output by the video decoding unit 22, and reconstruct the video image at the display viewpoint according to the depth images and color images in the decoded video image data to obtain the reconstructed image at the display viewpoint; and, repair the cavity in the reconstructed image at the display viewpoint according to the color image in the decoded video image data, and/or repair the cavity in the reconstructed image at the display viewpoint through linear or nonlinear interpolation to obtain the video image at the display viewpoint. The receiving device 2 in this embodiment may further include a display inputting unit 25, which is adapted to obtain display information. The display information includes information such as the watching viewpoint or display viewpoint, display distance, and display mode. The image reconstruction system 23 can reconstruct the video image at the viewpoint to be displayed on the basis of the decoded video image data according to the display information. The sending device in this embodiment may further include: a rendering unit 26, adapted to receive the video image at the display viewpoint and render the video image; and a displaying unit 27, adapted to receive data of the video image rendered by the rendering unit 26, and display the video image at the display viewpoint. The rendering unit 26 may also receive the decoded video image data sent by the video decoding unit 22 directly, render the data, and send it to the displaying unit 27 for displaying. Additionally, the receiving device 2 may further include a voice decoding unit, a system controlling unit, and/or a user data unit. The voice decoding unit is adapted to decode the received encoded voice data. The system controlling unit is adapted to process the received system command data. The user data unit is adapted to store and edit the received file data. The voice decoding unit, the system controlling unit, and the user data unit are not illustrated in the accompanying drawings.

The principles and functions of the image reconstruction system 23 are described below in more detail:

The image reconstruction system is adapted to reconstruct the images at the virtual viewpoints according to the obtained data of color images and depth images of the scene. The technology of reconstructing the images at the virtual viewpoints may be based on image rendering. In the reconstruction technology based on image rendering, $I_O$ represents an original texture image; $I_N$ represents a new reconstructed viewpoint image; d represents a depth image; $d(x, y)$ represents a parallax value at pixel (x, y); and $\alpha$ is a weight of offset. Taking the parallel image collecting apparatuses as an example, for each pixel (x, y) in the reconstructed image at a viewpoint, the following equation applies:

$$I_O(x,y)=I_N(x+\alpha \cdot d(x,y),y)$$

Depending on the type and quantity of the image collecting apparatuses in the image collecting unit, the method for reconstructing the images at the virtual viewpoints according to the depth images and color images obtained by each image collecting apparatus differs.

If the image collecting apparatus for collecting video data includes one or more depth image collecting apparatuses 110 and a depth image collecting apparatus 111, the steps of reconstructing the image at the virtual viewpoint are as follows:

(1) Perform reconstruction by using the color image $I_1$ and the depth image $D_1$ output by one of the depth image collecting apparatuses $DC_1$ according to a general algorithm in the foregoing reconstruction technology based on image rendering, and obtain a reconstructed image $I_v^1$ at virtual viewpoint v in an image collecting apparatus group.

(2) Perform reconstruction according to the foregoing general algorithm by using the color image $I_2$ and the depth image $D_2$ output by another depth image collecting apparatus $DC_2$, and obtain another reconstructed image $I_v^2$ on the same virtual viewpoint v.

(3) Work out the final reconstructed image $I_v$ at virtual viewpoint V. $I_v$ is a union of and $I_v^1$ and $I_v^2$, namely, $I_v=I_v^1 \bullet I_v^2$. $I_v^2$ can fill the cavity in the image $I_v^1$. The intersection in and $I_v^1$ and $I_v^2$ can be finally obtained through weighting, for example, according to: $I(x,y)=w_1 I_v^1(x,y)+w_2 I_v^2(x,y)$, where $w_1$ and $w_2$ are weights related to viewpoints.

(4) For the cavity left in the reconstructed image $I_v$ after step (3), determine the information about the pixels in the cavity according to the luminance, chrominance and depth of the pixels around the cavity, and repair the cavity according to such information, for example, through linear or nonlinear interpolation. Finally, obtain the video image at this virtual viewpoint.

Likewise, if the image collecting apparatus for collecting video data includes only one depth image collecting apparatus 110, a depth image collecting apparatus 111, and an ordinary image collecting apparatus 112, the steps of reconstructing the image at the virtual viewpoint are as follows:

(1) Perform reconstruction according to the foregoing general algorithm by using the color image $I_1$ and the depth image D output by the depth image collecting apparatus DC, and obtain a reconstructed image $I_v$ at the virtual viewpoint v in the image collecting apparatus group.

(2) For a cavity that occurs in $I_v$, fill the cavity by using the color image $I_2$ output by the ordinary image collecting apparatus. The method for filling the cavity is: First, work out the location relation between the ordinary image collecting apparatus and the depth image collecting apparatus, for example, according to parameters derived from calibration of the image collecting apparatus; use the depth image D to find a corresponding location in $I_2$ namely, a location corresponding to the location of the cavity in $I_v$; perform affine transformation for the pixel of $I_2$ in the found location, and map the pixel to $I_v$ for filling the cavity in $I_v$.

(3) For the cavity left in $I_v$ after step (2), repair the cavity through linear or nonlinear interpolation, and obtain the video image at this virtual viewpoint finally.

Meanwhile, the image reconstruction system can filter the reconstructed video images at the viewpoints to improve the effect of the video images.

In practice, as shown in FIG. 18, the image reconstruction system in this embodiment may include: a first ordinary image collecting apparatus 610, a second ordinary image collecting apparatus 620, a first depth image collecting apparatus 630, a first determining apparatus 640, a first transforming apparatus 650, and a first reconstructing apparatus 660; or, as shown in FIG. 19, the image reconstruction system in this embodiment may include: a first ordinary image collecting apparatus 610, a second ordinary image collecting apparatus 620, a first depth image collecting apparatus 630, a correcting apparatus 611, a first aligning apparatus 612, a first determining apparatus 640, a first transforming apparatus 650, and a first reconstructing apparatus 660; or, as shown in FIG. 20, the image reconstruction system in this embodiment may include: a first ordinary image collecting apparatus 610, a second ordinary image collecting apparatus 620, a first depth image collecting apparatus 630, a correcting apparatus 611, a first aligning apparatus 612, a first determining apparatus 640, a first transforming apparatus 650, a first reconstructing apparatus 660, a second depth image collecting apparatus 710, a second determining apparatus 720, a second transforming apparatus 730, a second reconstructing apparatus 740, and a cavity filling apparatus 750; or, as shown in FIG. 21, the image reconstruction system in this embodiment may include: an ordinary image collecting apparatus 810, a depth image collecting apparatus 820, a transforming apparatus 830, and a reconstructing apparatus 840; or, as shown in FIG. 22, the image reconstruction system in this embodiment may include: an ordinary image collecting apparatus 810, a depth image collecting apparatus 820, a transforming apparatus 830, a reconstructing apparatus 840, a determining apparatus 850, and an aligning apparatus 860. Specifically, the structure and functions of the image reconstruction system in this embodiment may be the same as those of the image reconstruction system in the previous embodiment described above, and are not further described here.

Besides, the video collecting unit 11 in the sending device 1 in this embodiment may include at least one collection controlling module 113, a synchronizing module 114, and a calibrating module 115; the video outputting unit 13 may include an output processing module 131 and an output interface module 132; and the sending device 1 may further include a preprocessing unit 14, a multiplexing unit 15, a control inputting unit 16, an audio encoding unit, a system controlling unit, and a user data unit. The collection controlling module 113 may be connected to various combinations of the depth image collecting apparatuses and the ordinary image collecting apparatuses to control the image collecting apparatuses to photograph the scene and collect images. Specifically, the structure of the sending device 1 in this embodiment is the same as that described in any embodiment of the 3D video sending device above, and is not further described here.

In this embodiment, the sending device may be integrated with the receiving device so that the integrated device can send the video image data to other devices and receive and process video image data sent by other devices. Meanwhile, the device can receive and process the video image data collected by the device itself, and display video images locally in real time. In this embodiment, the sending device may be connected to the receiving device through various wireless or wired networks in the prior art, and they are applicable to remote video image collection.

The image collecting apparatuses of the sending device in this embodiment collect video image data that include depth images and color images; the collected depth images are accurate, reliable, and highly real-time. The video image data can be transmitted to the receiving device, and the receiving device processes the video image data. The collected video image data includes depth images and color images. On the occasion of reconstructing the video images at the virtual viewpoints, multiple color images may be used to repair the cavity generated in the reconstruction based on only one color image. Therefore, the reconstructed images bring a good effect and are highly practical, and meet the requirements of 3D videos.

Finally, it should be noted that the above embodiments are merely provided for describing the technical solutions of the present invention, but not intended to limit the present invention. It is apparent that persons skilled in the art can make various modifications and variations to the invention without departing from the spirit and scope of the invention. The present invention is intended to cover the modifications and variations provided that they fall within the scope of protection defined by the following claims or their equivalents.

What is claimed is:

1. A 3-dimensional (3D) video communication method, comprising:

obtaining timestamped video image data of a scene, wherein: the video image data comprises at least one time stamped frame of depth image and at least two respective timestamped frames of color images; the timestamped video image data are collected by one of:

at least one first depth image collecting apparatus being placed at a known view point 1, wherein the first depth image collecting apparatus being capable of outputting timestamped depth information Z of the scene, and at least one second color image collecting apparatuses with a first of the second color collecting apparatus being placed at the same known view point 1, and a second of the second color collecting apparatus being placed at a known view point 2, wherein both the first and the second of the second color collecting apparatuses being capable of outputting respective timestamped color/grayscale video information of the scene;

encoding the respective timestamped video image data to obtain respective encoded timestamped video image data; and sending the respective encoded timestamped video image data in order to establish a mapping relation between the at least one timestamped frame of depth image and the at least two respective timestamped frames of color images for image reconstruction, wherein the timestamped depth information Z of the scene output by the first depth image collecting apparatus is utilized to calculate parallax information $\nabla x$ between the at least two second color image collecting apparatuses at the known view point 1 and the known view point 2, respectively, utilizing the equation:

$$Z = \frac{fB}{x_2 - x_1} = \frac{fB}{\nabla x}$$

wherein f is a known focal length of the respective at least one first depth image collecting apparatus and the at least one second color image collecting apparatus;

wherein B is a known baseline separation between two respective optical centers of the at least two second color image collecting apparatuses at known view point 1 and known view point 2, respectively, wherein $x_2-x_1=\nabla x$ is parallax information, $x_1$ and $x_2$ being respective horizontal coordinates of a same imaging point collected by the at least two second color image collecting apparatuses at known view point 1 and known view point 2, respectively.

2. The 3D video communication method according to claim 1, wherein the step of obtaining the timestamped video image data collected by the first and the second image collecting apparatuses comprises:

controlling all image collecting apparatuses to collect images of the scene synchronously;

calibrating each of the first and the second image collecting apparatuses for video images collected by each image collecting apparatus to obtain internal parameters and external parameters of each of the first and the second image collecting apparatuses; and setting up the mapping relation between the video images collected by each of the first and the second image collecting apparatuses and properties of each of the first and the second image collecting apparatuses according to the internal parameters and the external parameters, and using the mapping relation as timestamped video image data of the scene, wherein the properties of each of the first and the second image collecting apparatuses comprise the internal parameters and the external parameters of each of the first and the second image collecting apparatuses, and a collecting timestamp of each frame of the video images.

3. The 3D video communication method according to claim 2, wherein the step of controlling all image collecting apparatuses to collect images of the scene synchronously comprises:

providing synchronization signals, and controlling all image collecting apparatuses to collect the images of the scene synchronously according to the synchronization signals.

4. The 3D video communication method according to claim 2, wherein before encoding the respective timestamped video image data, the method further comprises:

correcting the timestamped video image data according to the properties of the image collecting apparatus, and obtaining corrected respective timestamped video image data.

5. The 3D video communication method according to claim 2, wherein before controlling all image collecting apparatuses to collect images of the scene synchronously, the method further comprises:

receiving externally input control information, and setting a perspective and photographing distance of each of the first and the second image collecting apparatuses according to the control information, wherein the control information comprises watching viewpoint, display mode, and display distance information.

6. A 3-dimensional (3D) video sending device, comprising at least a processor executing codes stored in a non-transitory memory storage, performing functions as a plurality of modules or units, wherein the plurality of modules or units comprise:

a video collecting unit, adapted to obtain timestamped video image data of a scene, wherein: the timestamped video image data comprises at least one depth image and at least two respective timestamped frames of color images and is collected by image collecting apparatuses; the video collecting unit comprises at least one first depth image collecting apparatus being placed at a known view point 1, wherein the first depth image collecting apparatus being capable of outputting timestamped depth information Z of the scene, and at least two second color image collecting apparatuses with a first of the second color collecting apparatus being placed at the same known view point 1, and a second of the second color collecting apparatus being placed at a known view point 2, wherein both the first and the second of the second color collecting apparatuses being capable of outputting respective timestamped color/grayscale video information of the scene;

a video encoding unit, adapted to encode respective timestamped video image data to obtain respective encoded timestamped video image data; and a video outputting unit, adapted to send the respective encoded timestamped video image data in order to establish a mapping relation between the at least one timestamped frame of depth image and the at least two respective timestamped frames of color images for image reconstruction, wherein the timestamped depth information Z of the scene output by the first depth image collecting apparatus is utilized to calculate parallax information $\nabla x$ between the at least two second color image collecting apparatuses at the known view point 1 and the known view point 2, respectively, utilizing the equation:

$$Z = \frac{fB}{x_2 - x_1} = \frac{fB}{\nabla x}$$

wherein f is a known focal length of the respective at least one first depth image collecting apparatus and the at least one second color image collecting apparatus;

wherein B is a known baseline separation between two respective optical centers of the at least two second color image collecting apparatuses at known view point 1 and known view point 2, respectively;

wherein $x_2-x_1=\nabla x$ is parallax information, $x_1$ and $x_2$ being respective horizontal coordinates of a same imaging point collected by the at least two second color image collecting apparatuses at known view point 1 and known view point 2, respectively.

7. The 3D video sending device according to claim 6, wherein the video collecting unit comprises:

a collection controlling module, adapted to control image collecting apparatuses connected to the collection controlling module to collect images of the scene;

a synchronizing module, adapted to generate synchronization signals, and output the synchronization signals to the collection controlling module, whereupon the collection controlling module controls all image collecting apparatuses to collect images of the scene synchronously; or adapted to output the synchronization signals to an external synchronization interface of each image collecting apparatus so that all image collecting apparatuses photograph the scene synchronously, wherein the synchronization signals are generated by the synchronizing module itself or are video output signals generated by one of the image collecting apparatuses;

a calibrating module, adapted to: receive respective video images collected by each of the first and the second image collecting apparatuses, calibrate each of the first and the second image collecting apparatuses according to the respective collected video images, obtain internal parameters and external parameters of each of the first and the second image collecting apparatuses, and send them to the collection controlling module; and the collection controlling module, further adapted to: set up the mapping relation between the respective video images collected by each image collecting apparatus and properties of the image collecting apparatus according to the internal parameters and the external parameters, and outputting the mapping relation as the timestamped video image data of the scene, wherein the properties of the image collecting apparatus comprise the internal parameters and the external parameters of each of the first and the second image collecting apparatuses, and a collecting timestamp of each respective frame of the video images.

8. The 3D video sending device according to claim 7, further comprising:
a preprocessing unit, adapted to: receive the timestamped video image data from the collection controlling module, wherein the timestamped video image data comprises the respective video images, the properties of each of the first and the second image collecting apparatuses, and the mapping relation between the respective video images and the properties of each of the first and the second image collecting apparatuses; correct the timestamped video image data according to the internal parameters and the external parameters of the image collecting apparatus, and output the corrected timestamped video image data.

9. The 3D video sending device according to claim 7, further comprising:
a control inputting unit, adapted to obtain control information and send the control information to the collection controlling module, wherein the control information comprises watching viewpoint, display mode, and display distance information.

10. A 3-dimensional (3D) video communication system, comprising a sending device and a receiving device, wherein:
the sending device comprises at least a first respective processor executing respective codes stored in a first respective non-transitory memory storage, performing respective functions as a first respective plurality of modules or units, wherein the first respective plurality of modules or units comprise:
a video collecting unit, adapted to obtain respective timestamped video image data of a scene, wherein: the respective timestamped video image data comprises at least one depth image and at least two color images which are collected by image collecting apparatuses; the video collecting unit comprises at least one first depth image collecting apparatus being placed at a known view point 1, wherein the first depth image collecting apparatus being capable of outputting timestamped depth information Z of the scene, and at least two second color image collecting apparatuses with a first of the second color collecting apparatus being placed at the same known view point 1, and a second of the second color collecting apparatus being placed at a known view point 2, wherein both the first and the second of the second color collecting apparatuses being capable of outputting respective timestamped color/grayscale video information of the scene;
a video encoding unit, adapted to encode the respective timestamped video image data to obtain respective encoded timestamped video image data; and
a video outputting unit, adapted to send the respective encoded timestamped video image data;
the receiving device comprises at least a second respective processor executing respective codes stored in a second respective non-transitory memory storage, performing respective functions as a second respective plurality of modules or units, wherein the second respective plurality of modules or units comprise:
a video receiving unit, adapted to receive the respective encoded timestamped video image data sent by the video outputting unit; and
a video decoding unit, adapted to decode the respective encoded timestamped video image data to obtain decoded timestamped video image data in order to establish a mapping relation between the at least one timestamped frame of depth image and the at least two respective timestamped frames of color images for image reconstruction, wherein the timestamped depth information Z of the scene output by the first depth image collecting apparatus is utilized to calculate parallax information $\nabla x$ between the at least two second color image collecting apparatuses at the known view point 1 and the known view point 2, respectively, utilizing the equation:

$$Z = \frac{fB}{x_2 - x_1} = \frac{fB}{\nabla x}$$

wherein f is a known focal length of the respective at least one first depth image collecting apparatus and the at least one second color image collecting apparatus;

wherein B is a known baseline separation between two respective optical centers of the at least two second color image collecting apparatuses at known view point 1 and known view point 2, respectively;

wherein $x_2 - x_1 = \nabla x$ is parallax information, $x_1$ and $x_2$ being respective horizontal coordinates of a same imaging point collected by the at least two second color image collecting apparatuses at known view point 1 and known view point 2, respectively.

11. The 3D video communication system according to claim 10, wherein the video collecting unit comprises:
a collection controlling module, adapted to control image collecting apparatuses connected to the collection controlling unit to collect respective images of the scene;
a synchronizing module, adapted to generate synchronization signals, and output the synchronization signals to the collection controlling module, whereupon the collection controlling module synchronizes all image collecting apparatuses; or adapted to output the synchronization signals to an external synchronization interface of each image collecting apparatus so that all image collecting apparatuses photograph the scene synchronously, wherein the synchronization signals are generated by the synchronizing module itself or are video output signals generated by one of the image collecting apparatuses;
a calibrating module, adapted to: receive video images collected by the image collecting apparatuses, calibrate each of the first and the second the image collecting apparatuses according to the collected video images, obtain internal parameters and external parameters of each of the first and the second image collecting apparatuses, and send them to the collection controlling module; and the collection controlling module, further adapted to: set up the mapping relation between the video images collected by each image collecting apparatus and properties of the image collecting apparatus according to the internal parameters and the external parameters, and output the mapping relation as respective timestamped video image data of the scene, wherein the properties of the image collecting apparatus comprise the internal parameters and the external parameters of the image collecting apparatus, and a collecting timestamp of each frame of the respective video images.

12. The 3D video communication system according to claim 11, wherein the sending device further comprises:

a preprocessing unit, adapted to: receive the respective timestamped video image data from the collection controlling module, wherein the respective timestamped video image data comprises the video images, the properties of the image collecting apparatus, and the mapping relation between the respective video images and the properties of each image collecting apparatus; correct the respective timestamped video image data according to the internal parameters and the external parameters of the image collecting apparatus, and output the corrected respective timestamped video image data.

13. The 3D video communication system according to claim 10, wherein: the receiving device further comprises an image reconstruction system and the image reconstruction system comprises:

an ordinary image collecting apparatus, adapted to obtain a color image at the known viewpoint 1;

a depth image collecting apparatus, adapted to obtain depth information at the same known viewpoint 1;

a transforming apparatus, adapted to perform depth-parallax transformation for the depth information to obtain parallax information corresponding to the depth information Z; and a reconstructing apparatus, adapted to reconstruct an image at a virtual viewpoint according to the color image at the known viewpoint and the parallax information Vx.

14. The 3D video communication system according to claim 10, wherein: the receiving device further comprises an image reconstruction system and the image reconstruction system comprises:

a first ordinary image collecting apparatus, adapted to obtain a first color image at the first known viewpoint 1;

a second ordinary image collecting apparatus, adapted to obtain a second color image at the second known viewpoint 2;

a first depth image collecting apparatus, adapted to obtain the first depth information at the first known viewpoint 1;

a first determining apparatus, adapted to determine a first depth-parallax mapping factor of the first depth information according to the first color image, the second color image, and the first depth information;

a first transforming apparatus, adapted to perform depth-parallax transformation for the first depth information according to the first depth-parallax mapping factor to obtain first parallax information; and a first reconstructing apparatus, adapted to reconstruct a third image at the virtual viewpoint according to the first color image and the first parallax information.

15. The 3D video communication system according to claim 14, wherein the image reconstruction system further comprises:

a second depth image collecting apparatus, adapted to obtain second depth information at the second known viewpoint 2;

a second determining apparatus, adapted to determine a second depth-parallax mapping factor of the second depth information according to the first color image, the second color image, and the second depth information;

a second transforming apparatus, adapted to perform depth-parallax transformation for the second depth information according to the second depth-parallax mapping factor to obtain second parallax information; and a second reconstructing apparatus, adapted to reconstruct a fourth image at the virtual viewpoint according to the second color image and the second parallax information.

16. The 3D video communication system according to claim 15, wherein the image reconstruction system further comprises:

a cavity filling apparatus, adapted to fill cavities according to the third image and the fourth image and generate a fifth image at the virtual viewpoint.

* * * * *